United States Patent
Inoue

(10) Patent No.: US 10,175,464 B2
(45) Date of Patent: Jan. 8, 2019

(54) ZOOM LENS AND IMAGE PICKUP APPARATUS INCLUDING THE SAME

(71) Applicant: CANON KABUSHIKI KAISHA, Tokyo (JP)

(72) Inventor: Suguru Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 14/972,537

(22) Filed: Dec. 17, 2015

(65) Prior Publication Data

US 2016/0178877 A1  Jun. 23, 2016

(30) Foreign Application Priority Data

Dec. 22, 2014  (JP) .................................. 2014-258167

(51) Int. Cl.
  *G02B 15/177*  (2006.01)
  *G02B 27/64*  (2006.01)

(52) U.S. Cl.
  CPC ......... *G02B 15/177* (2013.01); *G02B 27/646* (2013.01)

(58) Field of Classification Search
  CPC .......... G02B 13/00–13/20; G02B 15/00–15/28
  USPC ....................................................... 359/676
  See application file for complete search history.

(56) References Cited

U.S. PATENT DOCUMENTS

| | | | |
|---|---|---|---|
| 6,285,509 B1 * | 9/2001 | Nakayama | G02B 15/177 359/676 |
| 6,636,361 B2 | 10/2003 | Wada | |
| 2002/0060858 A1 | 5/2002 | Wada | |
| 2008/0192360 A1 * | 8/2008 | Chang | G02B 13/18 359/676 |
| 2012/0087017 A1 * | 4/2012 | Fujisaki | G02B 13/009 359/687 |
| 2012/0120501 A1 * | 5/2012 | Katayose | G02B 15/177 359/686 |

(Continued)

FOREIGN PATENT DOCUMENTS

| | | |
|---|---|---|
| CN | 103576301 A | 2/2014 |
| JP | H05-019169 A | 1/1993 |

(Continued)

OTHER PUBLICATIONS

German Office Action dated Jun. 7, 2017 in corresponding German Patent Application No. 102015122356.2 together with English translation, 9 pages.

(Continued)

*Primary Examiner* — Bumsuk Won
*Assistant Examiner* — Jeffrey Madonna
(74) *Attorney, Agent, or Firm* — Carter, Deluca, Farrell & Schmidt, LLP

(57) ABSTRACT

Provided is a zoom lens, including, in order from an object side to an image side: a first lens unit to a fourth lens unit having negative, positive, negative, and negative refractive powers; and a rear lens group. In the zoom lens, an interval between each pair of adjacent lens units is changed during zooming, the rear lens group has a positive refractive power over an entire zoom range, the third lens unit is configured to move in an optical axis direction during focusing, and each of a focal length of the zoom lens at a wide angle end (fw), and a focal length of the third lens unit (f3) is appropriately set.

24 Claims, 17 Drawing Sheets

(56) References Cited

U.S. PATENT DOCUMENTS

| | | | | |
|---|---|---|---|---|
| 2012/0194730 A1* | 8/2012 | Morooka | ............... | G02B 13/18 |
| | | | | 348/345 |
| 2014/0036137 A1 | 2/2014 | Inoue | | |
| 2014/0226218 A1* | 8/2014 | Nagahara | ............. | G02B 15/177 |
| | | | | 359/680 |
| 2014/0347523 A1 | 11/2014 | Kuwashiro | | |

FOREIGN PATENT DOCUMENTS

| | | |
|---|---|---|
| JP | H11-231220 A | 8/1999 |
| JP | 2002-055280 A | 2/2002 |
| JP | 2012-027283 A | 2/2012 |
| JP | 2012-173298 A | 9/2012 |
| JP | 2015-114625 A | 6/2015 |

OTHER PUBLICATIONS

Japanese Office Action dated Feb. 13, 2018 in corresponding Japanese Patent Application No. 2014-258167 with English translation.

Chinese Office Action dated Sep. 4, 2017 in corresponding Chinese Patent Application No. 201510954678.8 together with English translation, 12 pages.

* cited by examiner

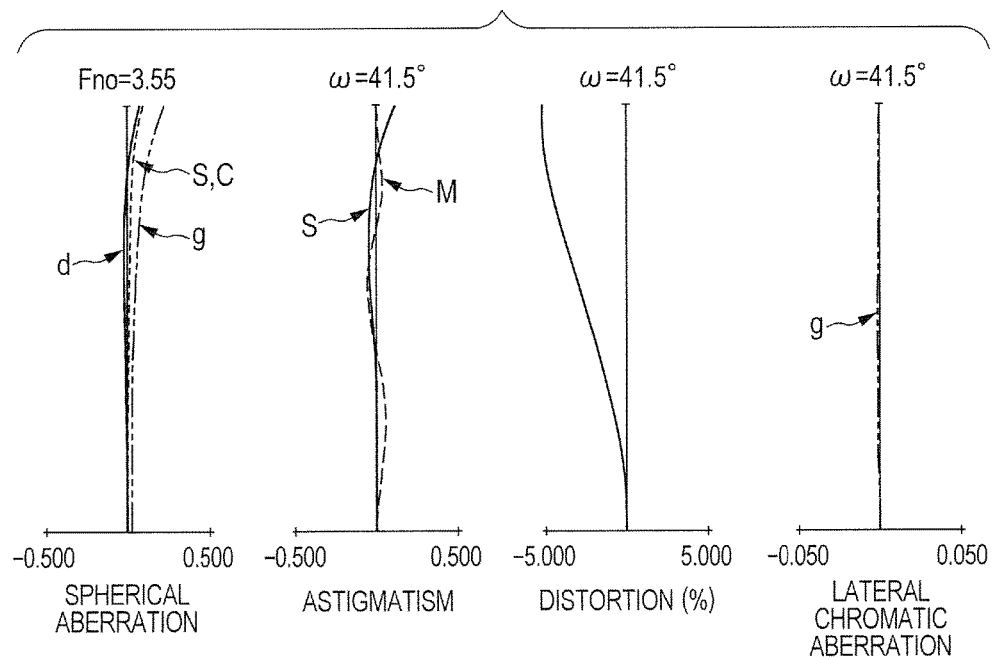
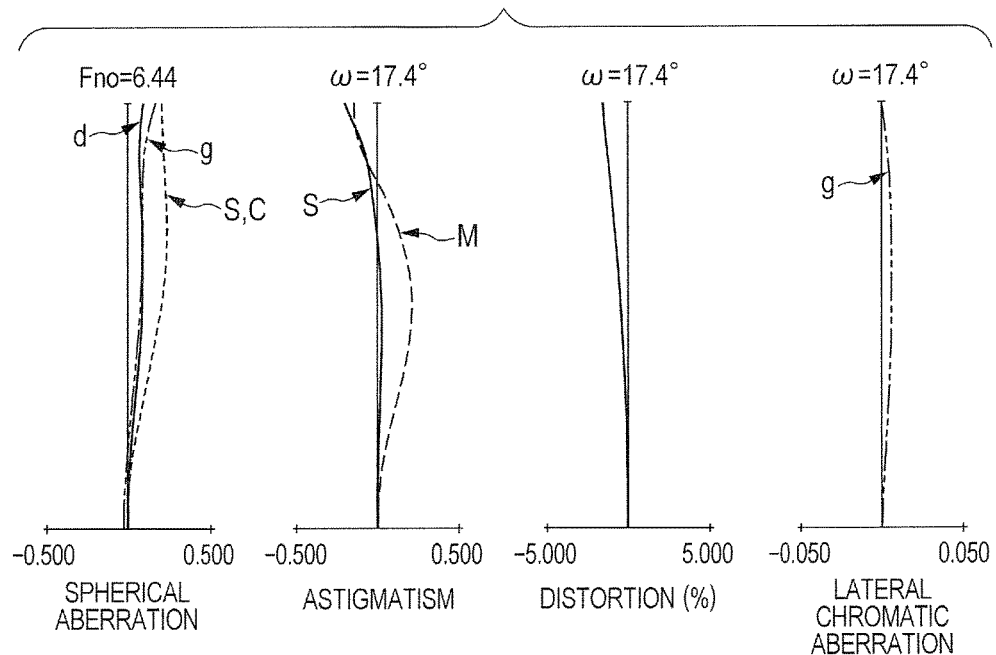

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system used for an image pickup apparatus such as a digital camera, a video camera, a TV camera, a monitoring camera, or a silver-halide film camera.

Description of the Related Art

As an image pickup optical system used for an image pickup apparatus (camera), a zoom lens having a wide angle of view, high resolution power, and a small size is required. The zoom lens is also required to be able to execute autofocusing (automatic focusing) at high speed and with high accuracy. As an autofocus system for use in picking up a still image, a phase difference system is often used. Meanwhile, a single-lens reflex camera in recent years is required to have a moving image capturing function and be able to perform autofocusing while capturing a moving image.

As an autofocus system for use in capturing the moving image, a system in which drive sound generated in driving a focus lens unit is small and which is capable of executing focusing at high speed is required. As an autofocus system that satisfies those requirements, a high-frequency detection system (TV-AF system) in which a high-frequency component in an image pickup signal is detected to evaluate an in-focus state of an image pickup optical system has been known.

In an image pickup apparatus using the TV-AF system, the focus lens unit is oscillated in an optical axis direction at high speed (hereinafter referred to as "wobbling") to detect a direction of a shift from the in-focus state. Then, after the wobbling, a signal component in a particular frequency band in an image region is detected from an output signal of an image sensor to calculate an optimal position of the focus lens unit in the optical axis direction at which the in-focus state is obtained. Thereafter, the focus lens unit is moved to the optimal position to complete focusing.

In capturing the moving image, the focus lens unit needs to be driven at high speed and as quietly as possible so that drive sound of a motor, in particular, is not recorded. Therefore, the focus lens unit is strongly required to be small in size and weight. Heretofore, as a zoom lens having a wide angle of view and a small size as an entire system, there has been known a negative lead type zoom lens in which a lens unit having a negative refractive power is arranged closest to an object side. As the negative lead type zoom lens, there has been known a zoom lens in which a lens unit that is small in size and weight is used to perform focusing.

In Japanese Patent Application Laid-Open No. 2012-173298, there is disclosed a zoom lens including, in order from an object side to an image side, a first lens unit to a fourth lens unit having negative, positive, negative, and positive refractive powers, in which an interval between each pair of adjacent lens units is changed to perform zooming, and in which the third lens unit is used to perform focusing. In Japanese Patent Application Laid-Open No. 2012-27283, there is described a zoom lens including, in order from an object side to an image side, a first lens unit to a fifth lens unit having negative, positive, negative, negative, and positive refractive powers, in which an interval between each pair of adjacent lens units is changed to perform zooming, and in which the first lens unit or the fourth lens unit is used to perform focusing.

The zoom lens used for the image pickup apparatus is strongly required to have the wide angle of view, have a small size as the entire system of the zoom lens, include the focus lens unit being small in size and weight, be capable of performing focusing at high speed, be small in aberration variations during focusing, and the like. In order for the focus lens unit to be small in size and weight, it is required to reduce the number of constituent lenses of the focus lens unit. However, when the number of constituent lenses of the focus lens unit is reduced, residual aberrations in the focus lens unit are increased. Therefore, the aberration variations during focusing are increased, and hence it becomes difficult to obtain good optical performance over the entire object distance from a long distance to a short distance.

Meanwhile, when a power of the focus lens unit is reduced in order to reduce the aberration variations during focusing, a movement amount during focusing is increased, and a total length of the zoom lens is increased. In order to obtain the zoom lens having the small size as the entire system, having the wide angle of view, being capable of performing focusing at high speed, and having small aberration variations during focusing, it is important to appropriately set the number of lens units, the refractive powers of the respective lens units, and a selection, a lens configuration, and the like of the focus lens unit.

In the negative lead type zoom lens, in particular, it is important which of a plurality of lens units constituting the zoom lens is selected as the focus lens unit. It is also important to appropriately set a refractive power of the focus lens unit, the movement amount of the focus lens unit during zooming, and the like. When those elements are not appropriately set, it becomes difficult to obtain the zoom lens having the small size as the entire system, having the wide angle of view, and having high optical performance over the entire object distance.

SUMMARY OF THE INVENTION

According to one embodiment of the present invention, there is provided a zoom lens, including, in order from an object side to an image side:
  a first lens unit having a negative refractive power;
  a second lens unit having a positive refractive power;
  a third lens unit having a negative refractive power;
  a fourth lens unit having a negative refractive power; and
  a rear lens group including at least one lens unit,
  in which an interval between each pair of adjacent lens units is changed during zooming,
  in which the rear lens group has a positive refractive power over an entire zoom range,
  in which the third lens unit is configured to move in an optical axis direction during focusing, and
  in which the following conditional expression is satisfied:

$$0.85 < |f3/fw| < 3.15,$$

where fw represents a focal length of the zoom lens at a wide angle end, and f3 represents a focal length of the third lens unit.

In addition, according to another embodiment of the present invention, there is provided a zoom lens, including, in order from an object side to an image side:
  a first lens unit having a negative refractive power;
  a second lens unit having a positive refractive power;
  a third lens unit having a negative refractive power;
  a fourth lens unit having a negative refractive power; and a rear lens group including at least one lens unit, in which an interval between each pair of adjacent lens units is changed during zooming, in which the rear lens group has a positive refractive power over an entire zoom range, in which the third lens unit is configured to move in an optical axis direction during focusing, and in which the following conditional expressions are satisfied:

$$1.20 < f4/f3 < 11.50; \text{ and}$$

$$-1.80 < m4/fw < -1.25,$$

where fw represents a focal length of the zoom lens at a wide angle end, f3 represents a focal length of the third lens unit, f4 represents a focal length of the fourth lens unit, and m4 represents a movement amount of the fourth lens unit during zooming from the wide angle end to a telephoto end.

Further features of the present invention will become apparent from the following description of exemplary embodiments with reference to the attached drawings.

BRIEF DESCRIPTION OF THE DRAWINGS

FIG. 2A is an aberration diagram of Embodiment 1 when focused at infinity at a wide angle end.

FIG. 2B is an aberration diagram of Embodiment 1 when focused at infinity at a telephoto end.

DESCRIPTION OF THE EMBODIMENTS

Now, exemplary embodiments of the present invention are described in detail with reference to the attached drawings. A zoom lens of the present invention includes, in order from an object side to an image side, a first lens unit having a negative refractive power, a second lens unit having a positive refractive power, a third lens unit having a negative refractive power, a fourth lens unit having a negative refractive power, and a rear lens group including at least one lens unit. An interval between each pair of adjacent lens units is changed during zooming. The rear lens group has a positive refractive power over the entire zoom range. The third lens unit is configured to move in an optical axis direction during focusing.

Figure 1:
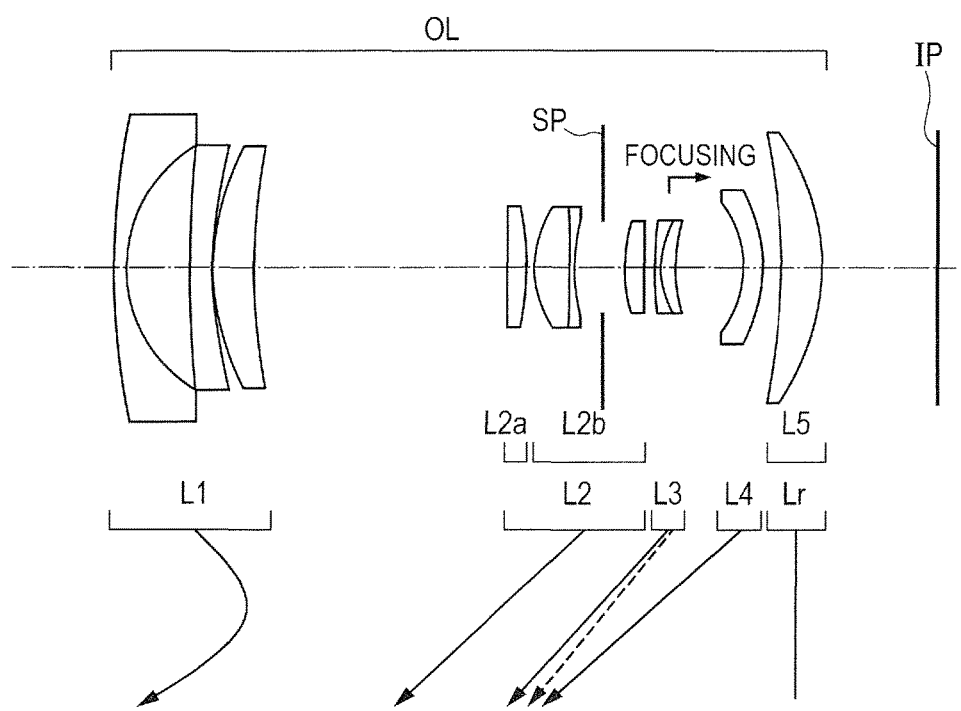
FIG. 1 is a lens cross-sectional view of Embodiment 1 of the present invention.
Figure 3:
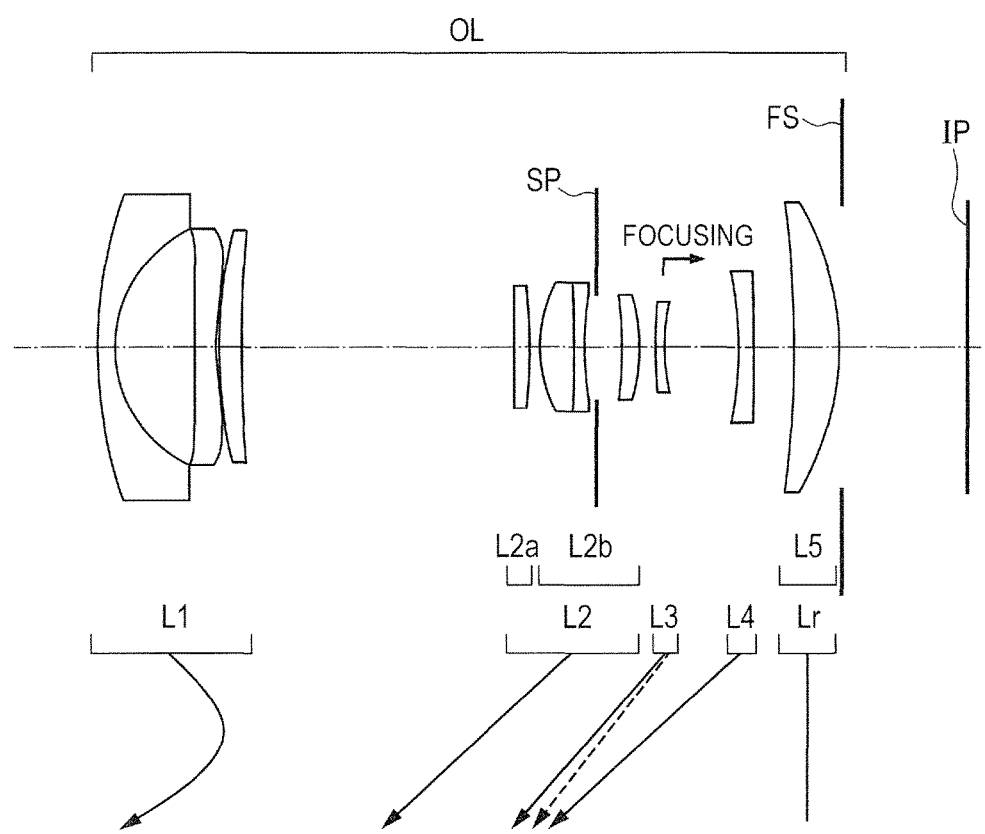
FIG. 3 is a lens cross-sectional view of Embodiment 2 of the present invention.
Figure 4A:
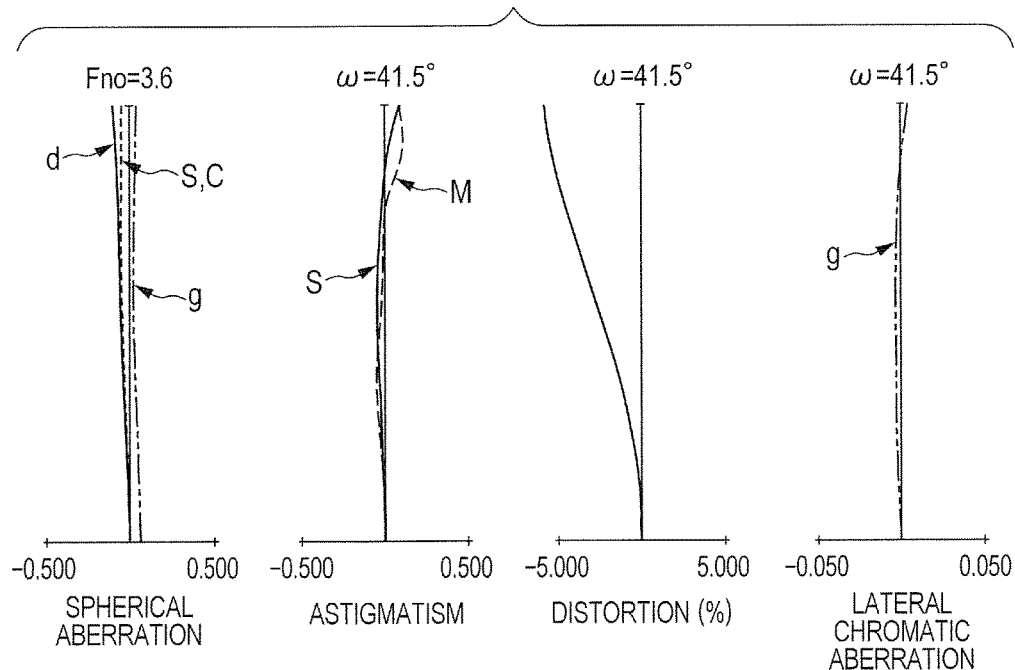
FIG. 4A is an aberration diagram of Embodiment 2 when focused at infinity at a wide angle end.
Figure 4B:
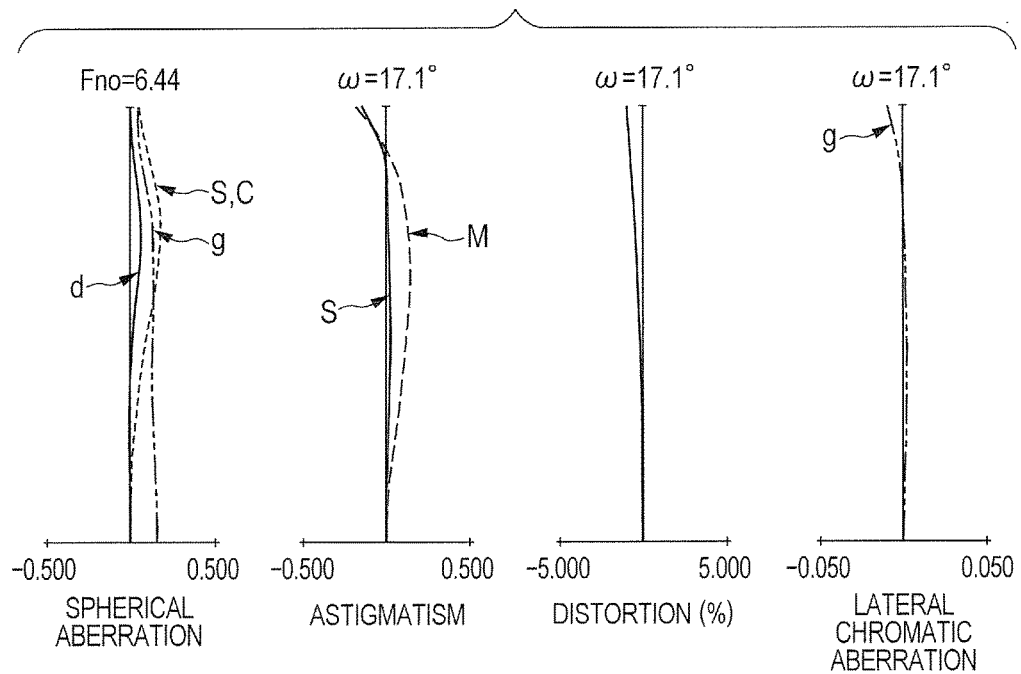
FIG. 4B is an aberration diagram of Embodiment 2 when focused at infinity at a telephoto end.

FIG. 1 is a lens cross-sectional view of Embodiment 1 of the present invention at a wide angle end. FIG. 2A and FIG. 2B are aberration diagrams of Embodiment 1 when focused at infinity at the wide angle end and a telephoto end, respectively. Embodiment 1 relates to a zoom lens having a zoom ratio of 2.83 and an f-number of 3.55 to 6.44. FIG. 3 is a lens cross-sectional view of Embodiment 2 of the present invention at a wide angle end. FIG. 4A and FIG. 4B are aberration diagrams of Embodiment 2 when focused at infinity at the wide angle end and a telephoto end, respectively. Embodiment 2 relates to a zoom lens having a zoom ratio of 2.88 and an f-number of 3.60 to 6.44.

Figure 5:
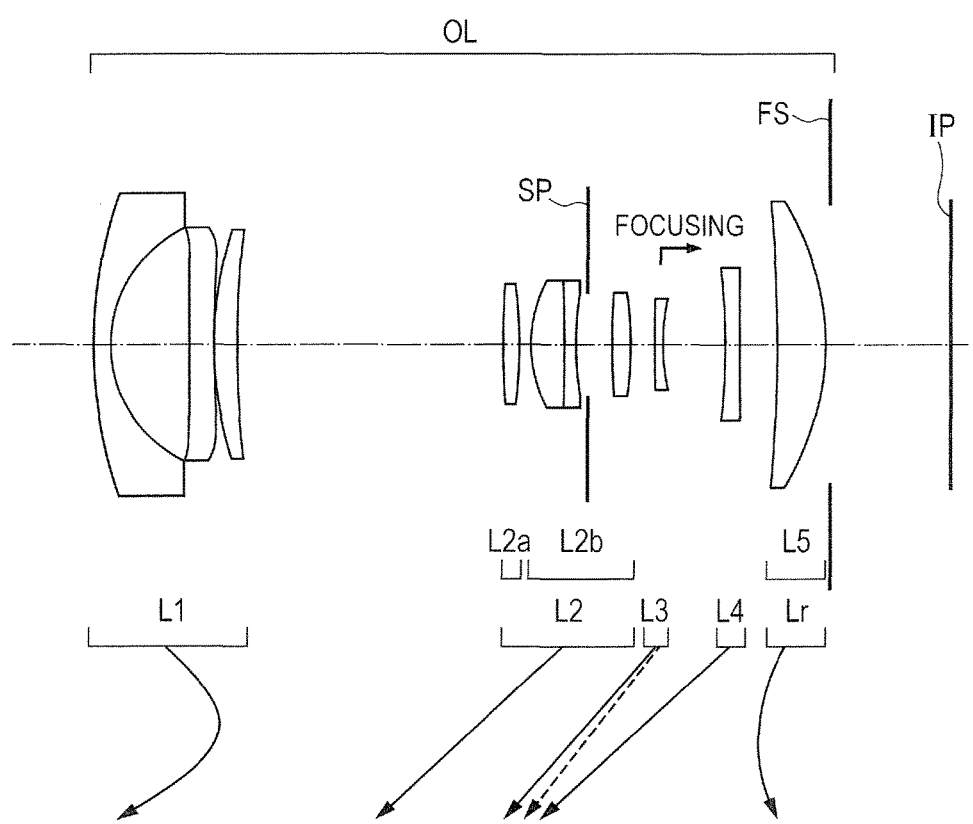
FIG. 5 is a lens cross-sectional view of Embodiment 3 of the present invention.
Figure 6A:
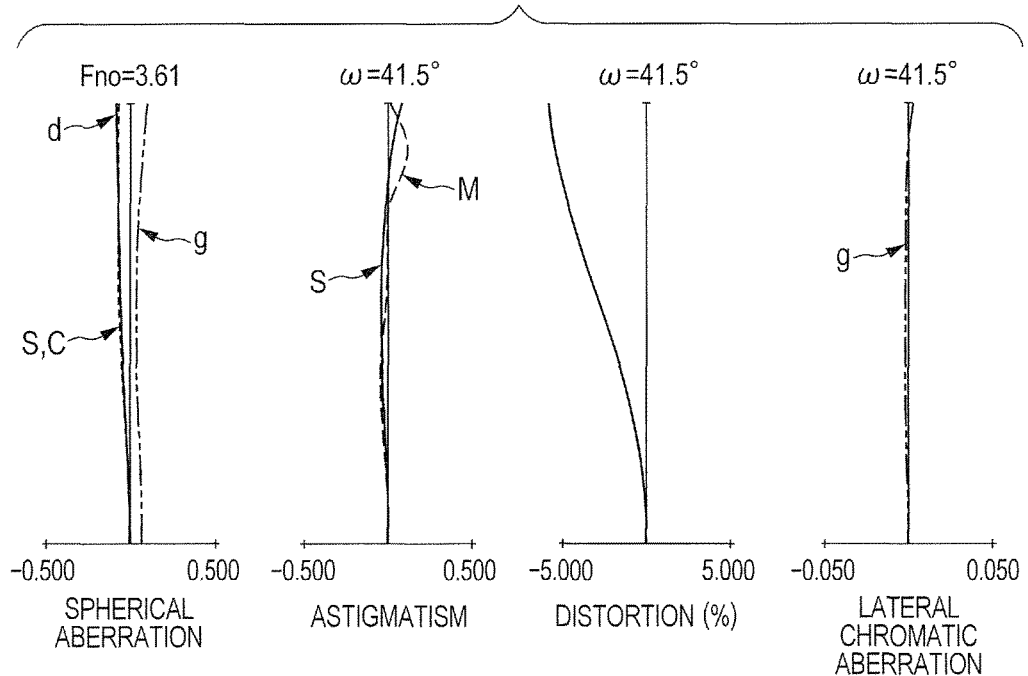
FIG. 6A is an aberration diagram of Embodiment 3 when focused at infinity at a wide angle end.
Figure 6B:
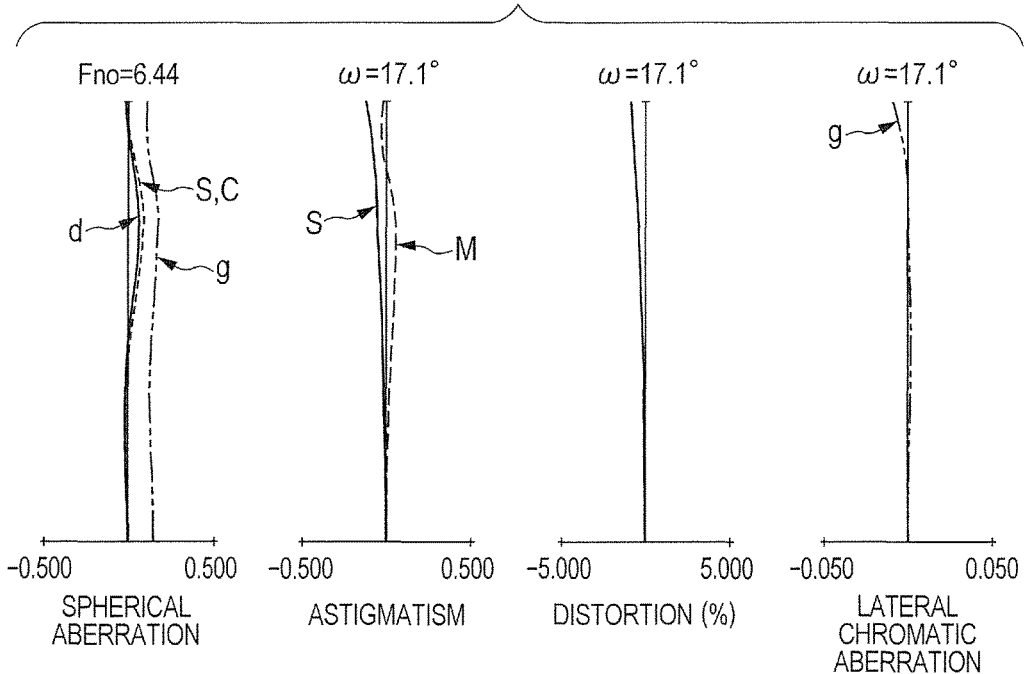
FIG. 6B is an aberration diagram of Embodiment 3 when focused at infinity at a telephoto end.
Figure 7:
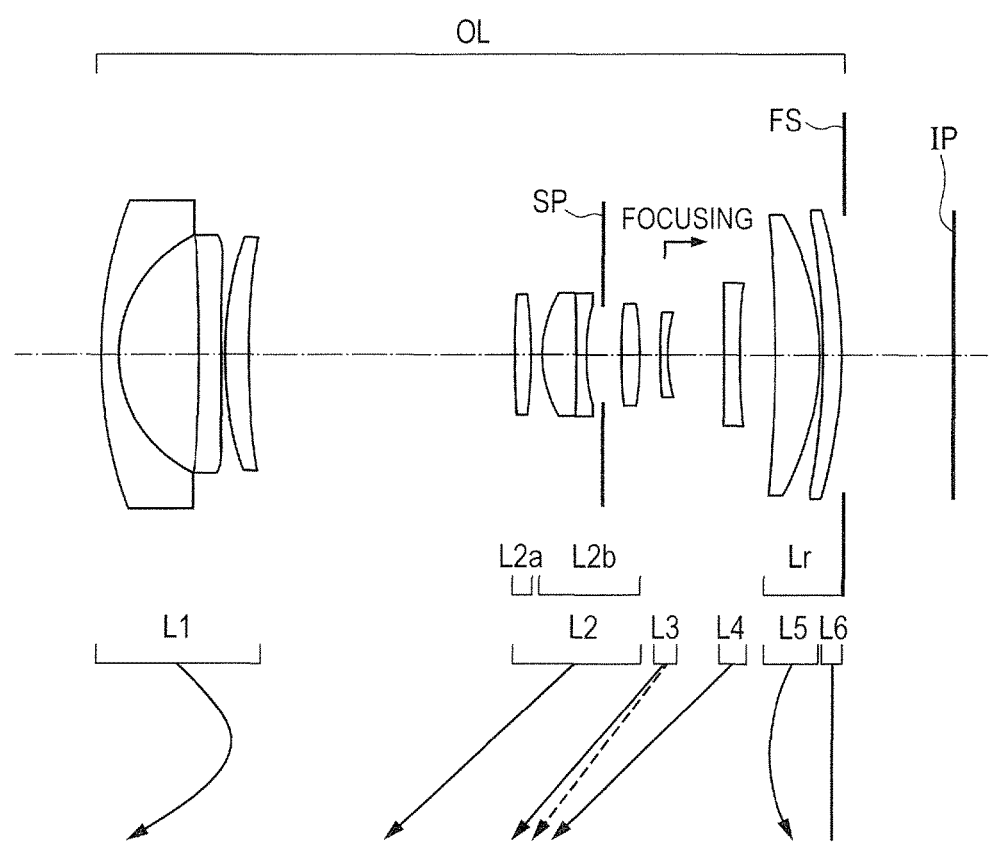
FIG. 7 is a lens cross-sectional view of Embodiment 4 of the present invention.
Figure 8A:
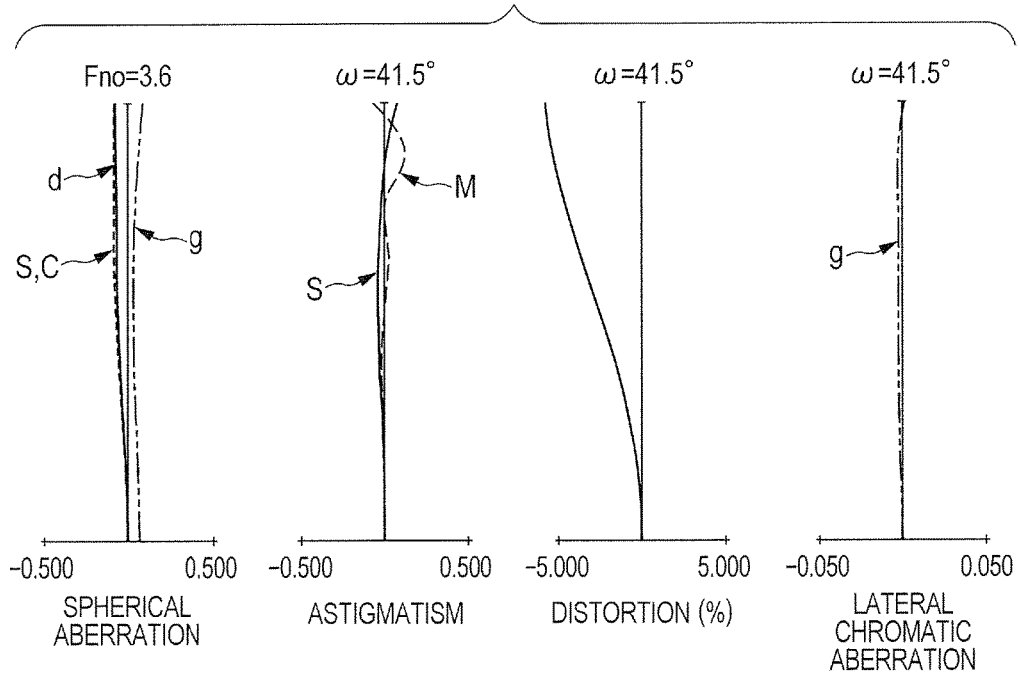
FIG. 8A is an aberration diagram of Embodiment 4 when focused at infinity at a wide angle end.
Figure 8B:
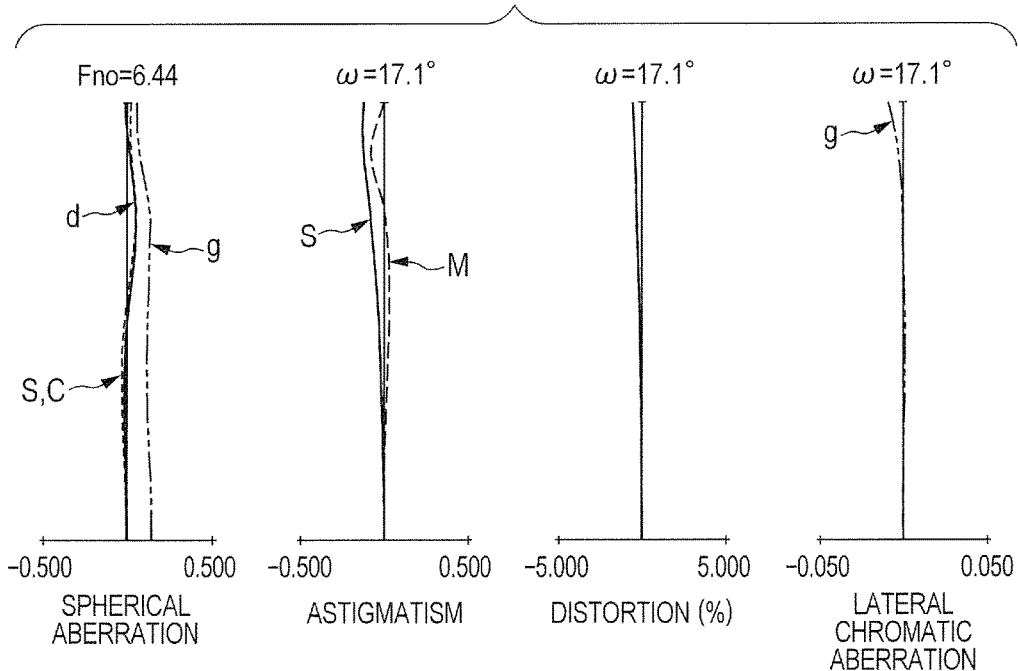
FIG. 8B is an aberration diagram of Embodiment 4 when focused at infinity at a telephoto end.

FIG. 5 is a lens cross-sectional view of Embodiment 3 of the present invention at a wide angle end. FIG. 6A and FIG. 6B are aberration diagrams of Embodiment 3 when focused at infinity at the wide angle end and a telephoto end, respectively. Embodiment 3 relates to a zoom lens having a zoom ratio of 2.88 and an f-number of 3.61 to 6.44. FIG. 7 is a lens cross-sectional view of Embodiment 4 of the present invention at a wide angle end. FIG. 8A and FIG. 8B are aberration diagrams of Embodiment 4 when focused at infinity at the wide angle end and a telephoto end, respectively. Embodiment 4 relates to a zoom lens having a zoom ratio of 2.88 and an f-number of 3.60 to 6.44.

Figure 9:
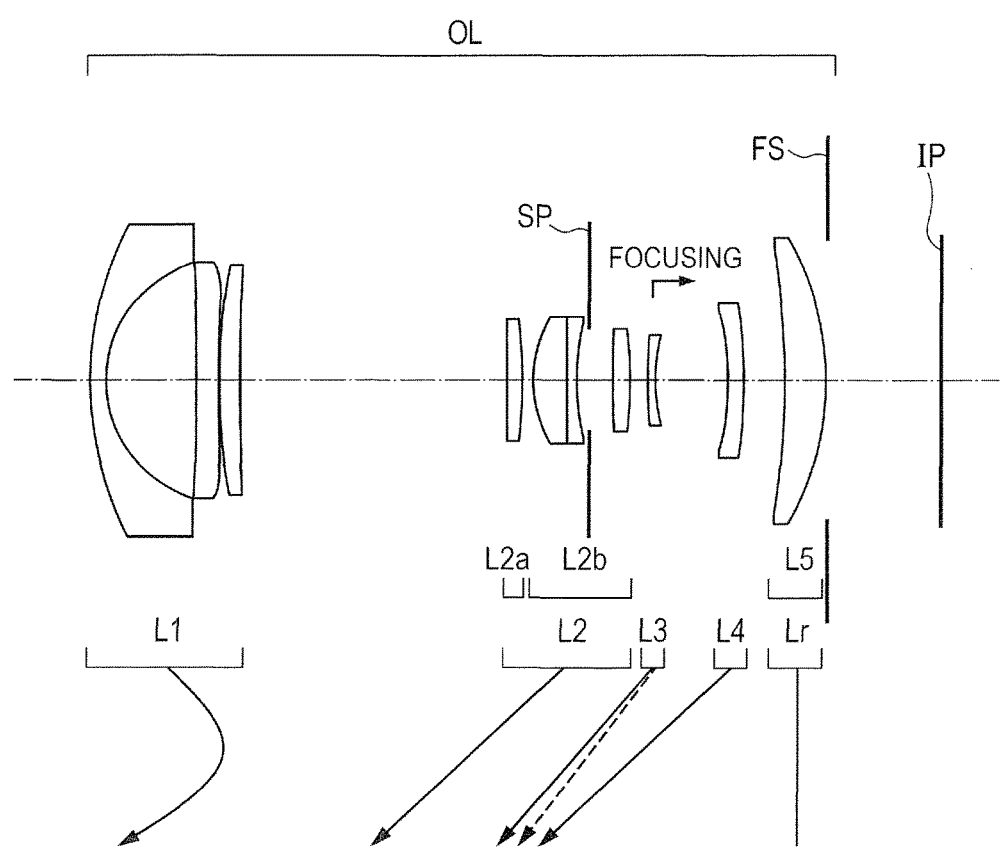
FIG. 9 is a lens cross-sectional view of Embodiment 5 of the present invention.
Figure 10A:
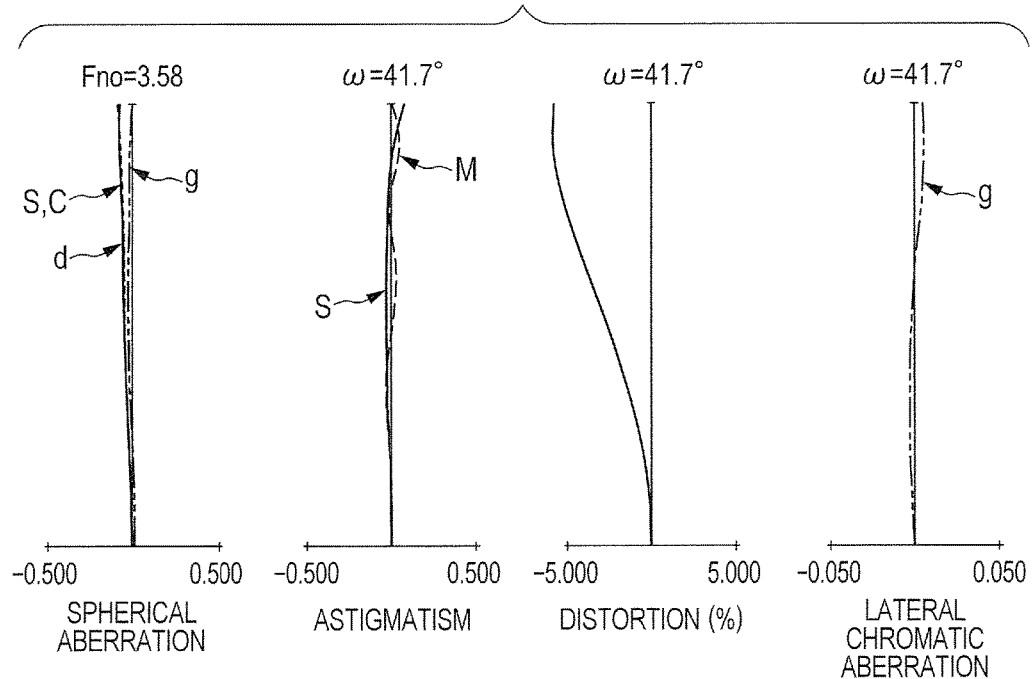
FIG. 10A is an aberration diagram of Embodiment 5 when focused at infinity at a wide angle end.
Figure 10B:
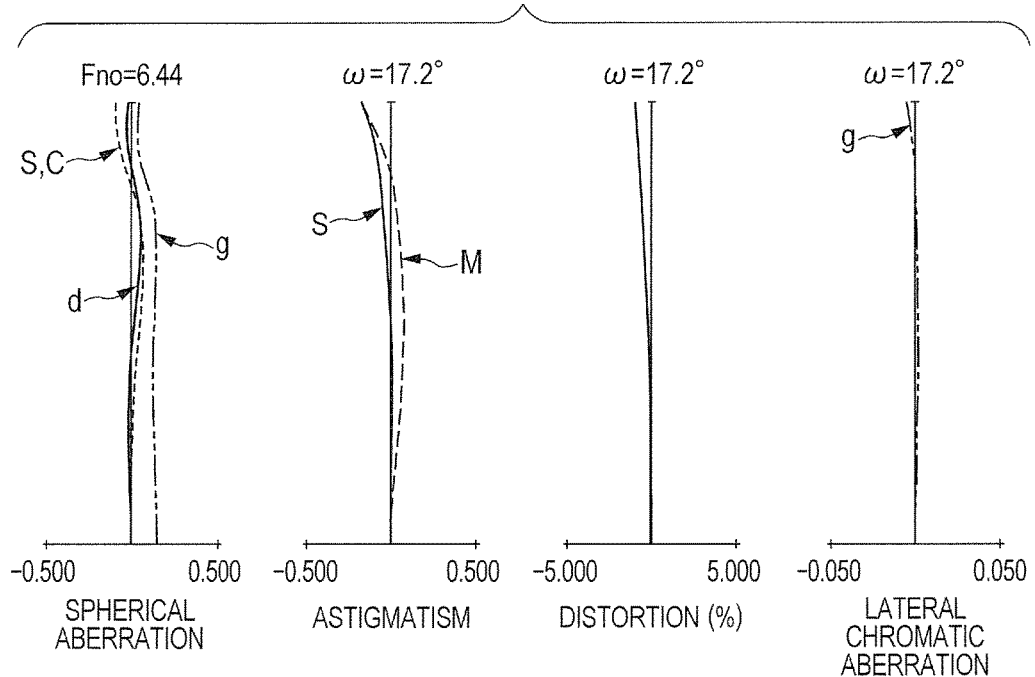
FIG. 10B is an aberration diagram of Embodiment 5 when focused at infinity at a telephoto end.
Figure 11:
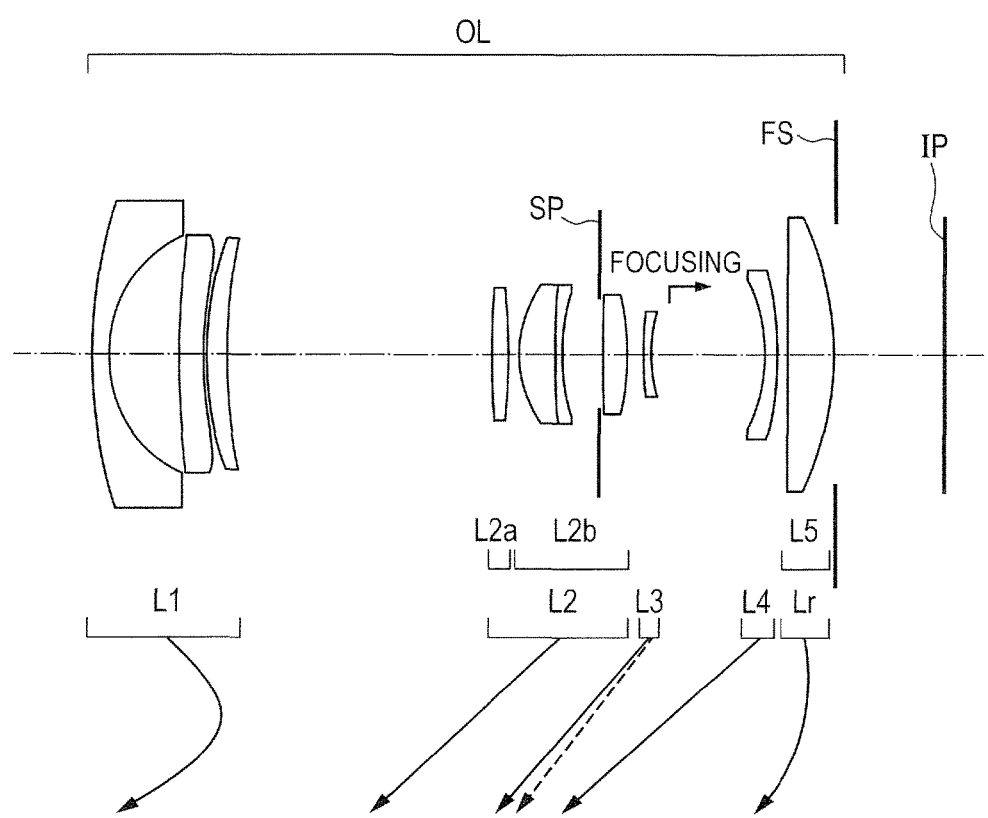
FIG. 11 is a lens cross-sectional view of Embodiment 6 of the present invention.
Figure 12A:
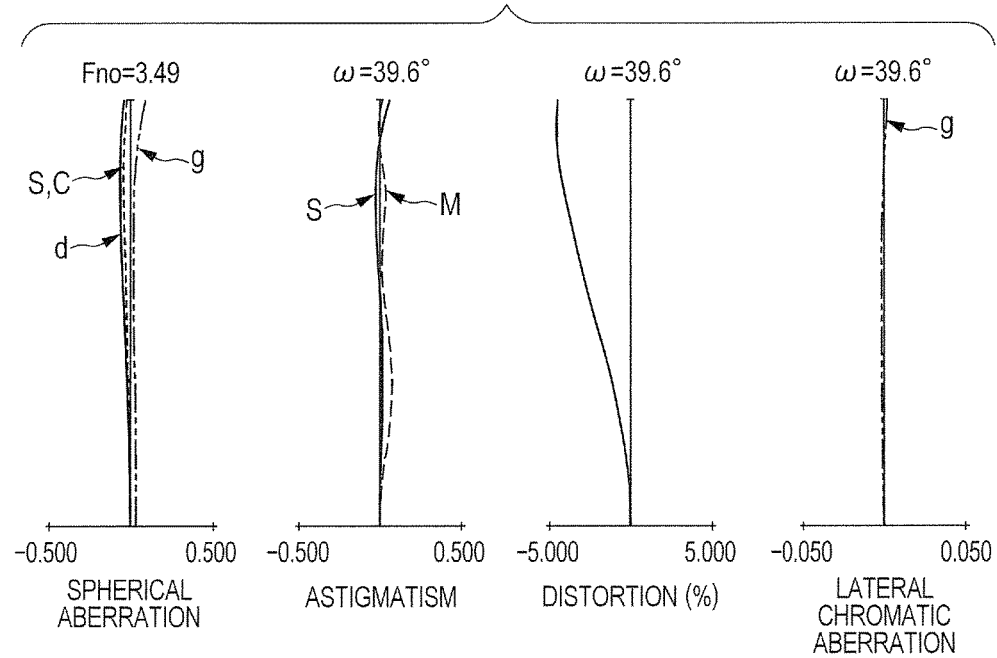
FIG. 12A is an aberration diagram of Embodiment 6 when focused at infinity at a wide angle end.
Figure 12B:
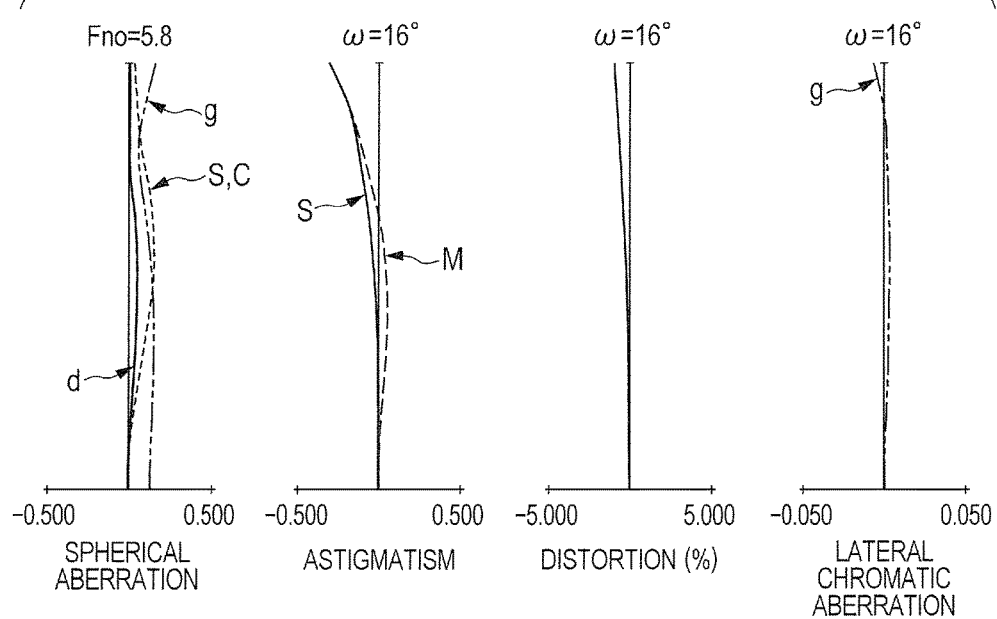
FIG. 12B is an aberration diagram of Embodiment 6 when focused at infinity at a telephoto end.

FIG. 9 is a lens cross-sectional view of Embodiment 5 of the present invention at a wide angle end. FIG. 10A and FIG. 10B are aberration diagrams of Embodiment 5 when focused at infinity at the wide angle end and a telephoto end, respectively. Embodiment 5 relates to a zoom lens having a zoom ratio of 2.88 and an f-number of 3.58 to 6.44. FIG. 11 is a lens cross-sectional view of Embodiment 6 of the present invention at a wide angle end. FIG. 12A and FIG. 12B are aberration diagrams of Embodiment 6 when focused at infinity at the wide angle end and a telephoto end, respectively. Embodiment 6 relates to a zoom lens having a zoom ratio of 2.88 and an f-number of 3.49 to 5.80.

Figure 13:
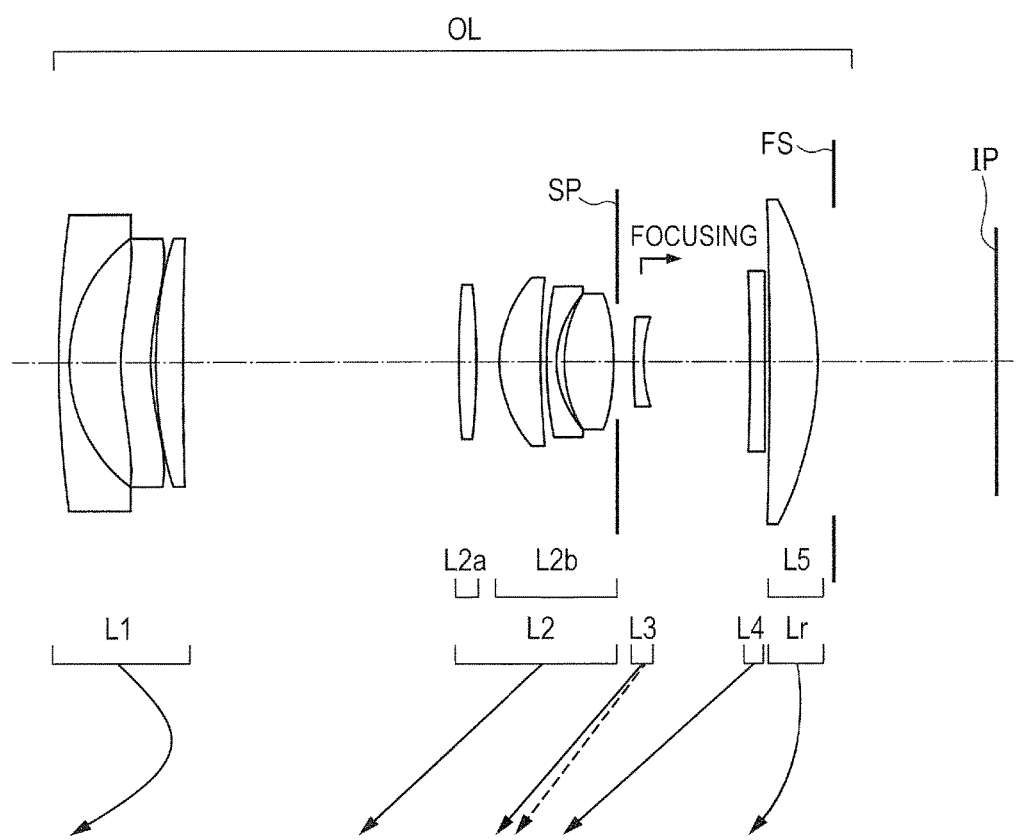
FIG. 13 is a lens cross-sectional view of Embodiment 7 of the present invention.
Figure 14A:
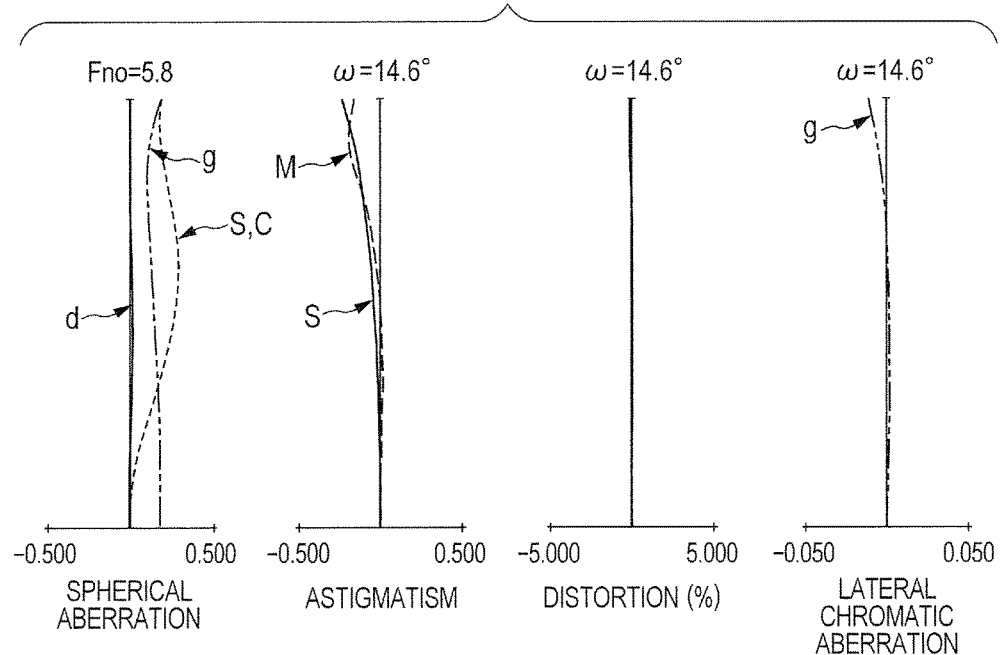
FIG. 14A is an aberration diagram of Embodiment 7 when focused at infinity at a wide angle end.
Figure 14B:
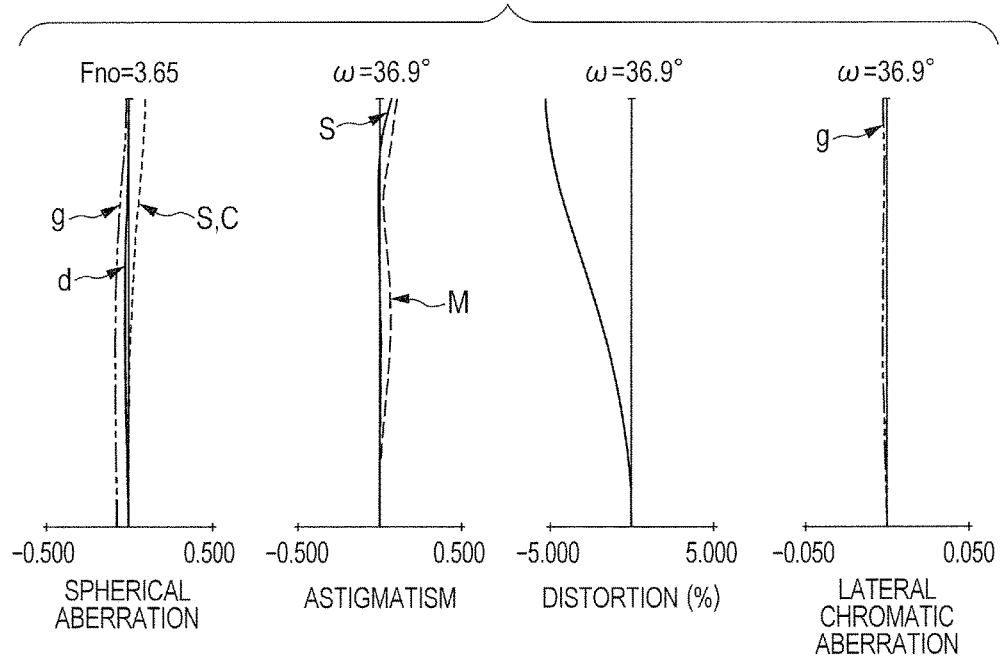
FIG. 14B is an aberration diagram of Embodiment 7 when focused at infinity at a telephoto end.
Figure 15:
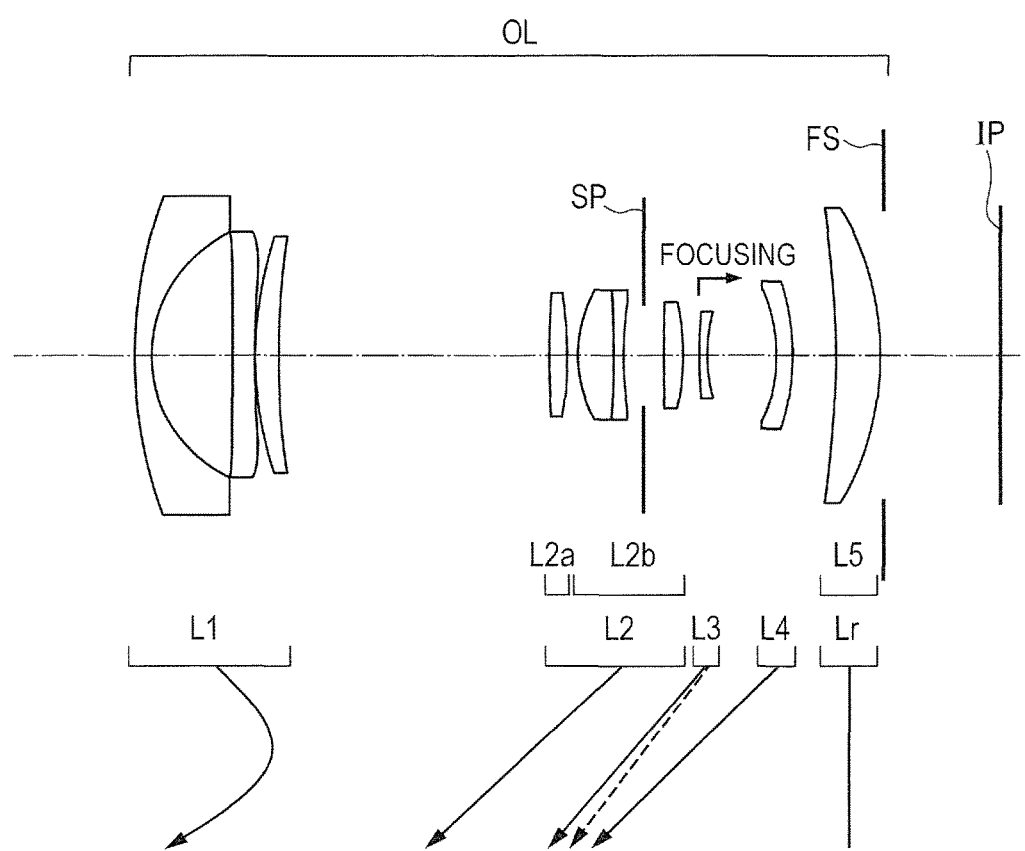
FIG. 15 is a lens cross-sectional view of Embodiment 8 of the present invention.
Figure 16A:
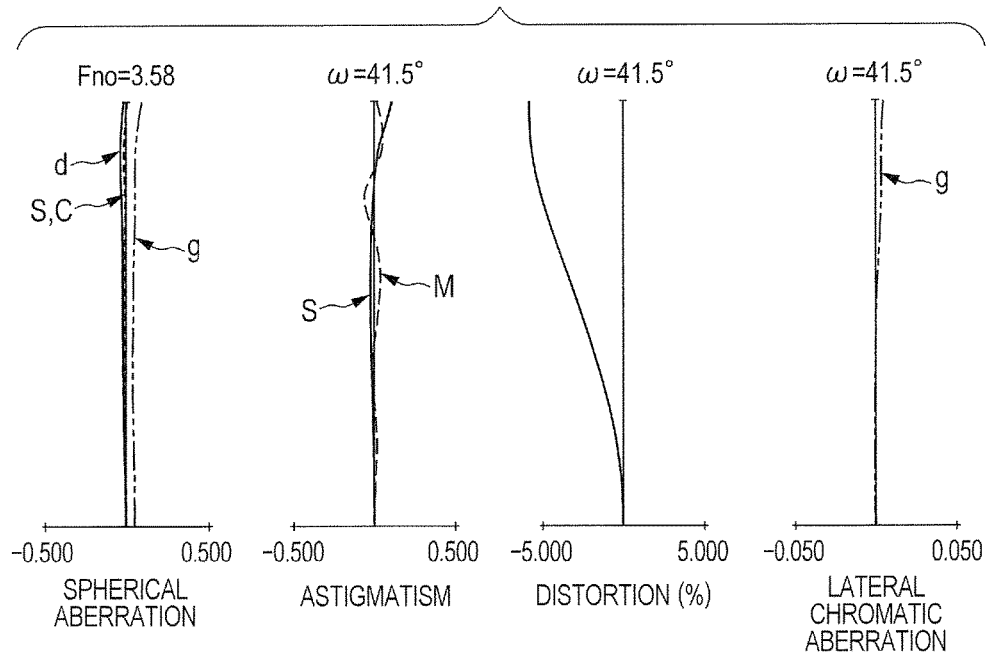
FIG. 16A is an aberration diagram of Embodiment 8 when focused at infinity at a wide angle end.
Figure 16B:
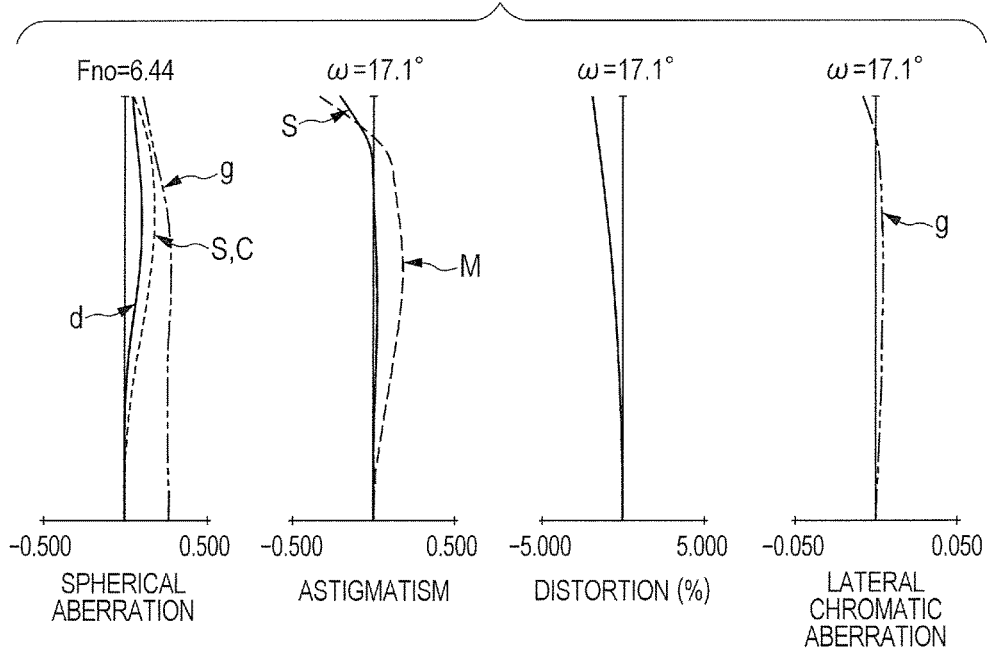
FIG. 16B is an aberration diagram of Embodiment 8 when focused at infinity at a telephoto end.
Figure 17:
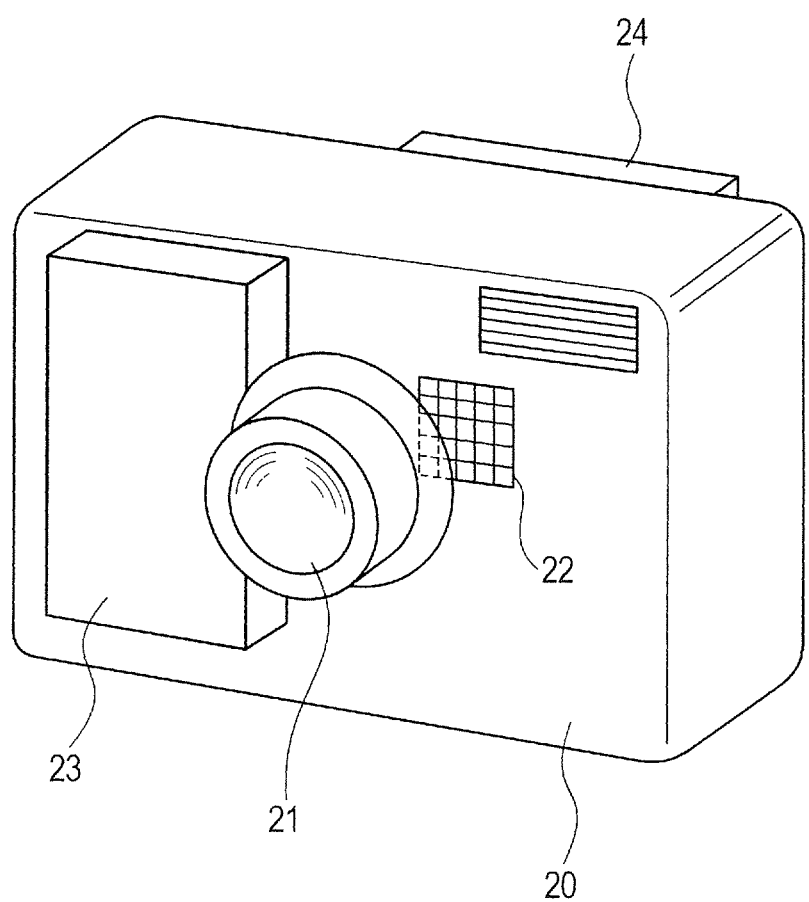
FIG. 17 is a schematic diagram of a main part of an image pickup apparatus.

FIG. 13 is a lens cross-sectional view of Embodiment 7 of the present invention at a wide angle end. FIG. 14A and FIG. 14B are aberration diagrams of Embodiment 7 when focused at infinity at the wide angle end and a telephoto end, respectively. Embodiment 7 relates to a zoom lens having a zoom ratio of 2.88 and an f-number of 3.65 to 5.80. FIG. 15 is a lens cross-sectional view of Embodiment 8 of the present invention at a wide angle end. FIG. 16A and FIG. 16B are aberration diagrams of Embodiment 8 when focused at infinity at the wide angle end and a telephoto end, respectively. Embodiment 8 relates to a zoom lens having a zoom ratio of 2.88 and an f-number of 3.58 to 6.44. FIG. 17 is a schematic diagram of a main part of an image pickup apparatus according to the present invention.

The zoom lens of each of Embodiments is an image pickup optical system used for an image pickup apparatus such as a video camera, a digital camera, or a silver-halide film camera. In the lens cross-sectional views, the left side is the object side (front), and the right side is the image side (rear). Further, the zoom lens of each of Embodiments may be used for a projector. In this case, the left side is a screen side, and the right side is a projected image side. A zoom lens OL is illustrated in each of the lens cross-sectional views. Symbol i represents an order of a lens unit from the object side, and symbol Li represents the i-th lens unit.

A rear lens group Lr includes at least one lens unit. An aperture stop SP is used for adjusting an amount of light. A flare-cut stop (FS stop) FS having a constant aperture diameter is arranged closest to the image side of a lens system. An image plane IP corresponds to an image pickup surface of a solid-state image pickup element (photoelectric conversion element) such as a CCD sensor or a CMOS sensor when the zoom lens is used as an image pickup optical system of a video camera or a digital still camera, and corresponds to a film surface in a case of a silver-halide film camera.

In the lens cross-sectional views, the solid line arrows indicate movement loci of the respective lens units when focused at infinity during zooming from the wide angle end to the telephoto end. The broken line arrow indicates a movement locus of the third lens unit L3 when focused at proximity during zooming from the wide angle end to the telephoto end. The arrow concerning focusing indicates a movement direction of a third lens unit L3 during focusing from infinity to proximity. A first lens subunit L2a forms a part of a second lens unit L2 and is configured to move during image blur correction. A second lens subunit L2b forms another part of the second lens unit L2.

The zoom lens OL in each of Embodiment 1 in FIG. 1, Embodiment 2 in FIG. 3, Embodiment 3 in FIG. 5, Embodiment 5 in FIG. 9, Embodiment 6 in FIG. 11, Embodiment in FIG. 13, and Embodiment 8 in FIG. 15 includes, in order from the object side to the image side, a first lens unit L1 having a negative refractive power, the second lens unit L2 having a positive refractive power, the third lens unit L3 having a negative refractive power, a fourth lens unit L4 having a negative refractive power, and the rear lens group Lr.

In each of Embodiments 1, 2, 5, and 8, during zooming from the wide angle end to the telephoto end, the first lens unit L1 is configured to move toward the image side and then toward the object side, and the second lens unit L2, the third lens unit L3, and the fourth lens unit L4 are configured to move toward the object side along mutually different loci. The fifth lens unit L5 is configured not to move. The third lens unit L3 functions as a focus lens unit configured to move along an optical axis toward the image side during focusing from infinity to proximity.

In Embodiment 3, during zooming from the wide angle end to the telephoto end, the first lens unit L1 is configured to move toward the image side and then toward the object side, and the second lens unit L2, the third lens unit L3, and the fourth lens unit L4 are configured to move toward the object side along mutually different loci. The fifth lens unit L5 is configured to move toward the object side and then toward the image side. The third lens unit L3 functions as a focus lens unit configured to move along an optical axis toward the image side during focusing from infinity to proximity.

In each of Embodiments 6 and 7, during zooming from the wide angle end to the telephoto end, the first lens unit L1 is configured to move toward the image side and then toward the object side, and the second lens unit L2, the third lens unit L3, and the fourth lens unit L4 are configured to move toward the object side along mutually different loci. The fifth lens unit L5 is configured to move toward the image side and then toward the object side. The third lens unit L3 functions as a focus lens unit configured to move along an optical axis toward the image side during focusing from infinity to proximity.

The zoom lens OL of Embodiment 4 in FIG. 7 includes, in order from the object side to the image side, the first lens unit L1 having a negative refractive power, the second lens unit L2 having a positive refractive power, the third lens unit L3 having a negative refractive power, the fourth lens unit L4 having a negative refractive power, and the rear lens group Lr.

The rear lens group Lr consists of a fifth lens unit L5 having a positive refractive power, and a sixth lens unit L6 having a positive refractive power. During zooming from the wide angle end to the telephoto end, the first lens unit L1 is configured to move toward the image side and then toward the object side, and the second lens unit L2 to the fourth lens unit L4 are configured to move toward the object side along mutually different loci. The fifth lens unit L5 is configured to move toward the object side and then toward the image side. The sixth lens unit L6 is configured not to move. The third lens unit L3 functions as a focus lens unit configured to move along the optical axis toward the image side during focusing from infinity to proximity.

In each of Embodiments, the aperture stop SP is configured to move integrally with the second lens unit L2 during zooming. Among the aberration diagrams, in the spherical aberration diagram, symbol d and symbol g represent a d-line and a g-line, respectively. Symbol S.C represents a sine condition. In the astigmatism diagram, symbol M and symbol S represent a meridional image plane and a sagittal image plane on the d-line, respectively. Further, in the diagrams for illustrating distortion, the distortion on the d-line is illustrated. A lateral chromatic aberration on the g-line is illustrated. Symbol Fno represents an f-number, and symbol ω represents a half angle of view. Note that, in each of Embodiments described below, the wide angle end and the telephoto end respectively refer to zoom positions when a magnification-varying lens unit is located at both ends of a mechanically movable range on an optical axis.

Next, features of the zoom lens in each of Embodiments of the present invention are described. In the zoom lens in which a lens unit having a negative refractive power is arranged closest to the object side, in order to downsize the focus lens unit, it is not preferred to use a first lens unit formed of a plurality of lenses having large lens diameters as the focus lens unit. As the focus lens unit, it is more preferred to select a lens unit that has a relatively small lens diameter, is arranged on the image side of the first lens unit, and is small in size and weight.

Moreover, in order to reduce a weight of the focus lens unit, it is desired that the focus lens unit consist of one lens element. The term "lens element" as used herein refers to an integrally formed lens, such as a single lens, a cemented lens formed by cementing a plurality of lenses, or a replica aspherical lens formed by laminating a resin layer on a surface of a spherical lens. In a case where the focus lens unit consists of a small number of lenses, in order to suppress aberration variations accompanying focusing, a refractive power (reciprocal of a focal length) of the focus lens unit needs to be reduced.

However, when the refractive power of the focus lens unit is reduced, during focusing from an object point at infinity to an object point at close proximity, a movement amount of the focus lens unit is increased, and an entire system of the zoom lens is increased in size. In order to obtain high optical performance while reducing the size and weight of the focus lens unit and downsizing the entire system of the zoom lens, it is important to configure the lens system so that the aberration variations accompanying focusing become relatively small. In particular, it is important to appropriately set the refractive power and a lens configuration of the focus lens unit.

The zoom lens in each of Embodiments includes, in order from the object side to the image side, the first lens unit L1 having a negative refractive power, the second lens unit L2 having a positive refractive power, the third lens unit L3 having a negative refractive power, the fourth lens unit L4 having a negative refractive power, and the rear lens group Lr including at least one lens unit. Then, an interval between each pair of adjacent lens units is changed during zooming. The third lens unit L3 consists of one lens element, and the third lens unit L3 is configured to move in the optical axis direction during focusing.

Moreover, in order to reduce a total length of the zoom lens (distance from the first lens surface to an image plane) at the wide angle end, a lens unit having a negative refractive power may be arranged on the image side. In each of Embodiments, the refractive power of the lens unit is shared appropriately between the third lens unit L3 and the fourth lens unit L4 to reduce the aberration variations during focusing while reducing the total length of the zoom lens.

In the zoom lens according to the present invention, the following conditional expression is satisfied:

$$0.85 < |f3/fw| < 3.15 \quad (1)$$

where fw represents a focal length of the zoom lens at the wide angle end, and f3 represents a focal length of the third lens unit L3.

In addition, in the zoom lens according to the present invention, the following conditional expressions are satisfied:

$$1.20 < f4/f3 < 11.50 \quad (3); \text{ and}$$

$$-1.80 < m4/fw < -1.25 \quad (4),$$

where f4 represents a focal length of the fourth lens unit L4, and m4 represents a movement amount of the fourth lens unit L4 during zooming from the wide angle end to the telephoto end.

The phrase "movement distance of a lens unit during zooming from the wide angle end to the telephoto end" as used herein refers to a difference between a position of the lens unit on the optical axis at the wide angle end and a position of the lens unit on the optical axis at the telephoto end. The sign of the movement distance is positive when the lens unit is located closer to the image side at the telephoto end than at the wide angle end, and negative when the lens unit is located closer to the object side at the telephoto end than at the wide angle end.

Next, technical meanings of the above-mentioned conditional expressions are described. The conditional expression (1) is intended to appropriately set the negative refractive power of the third lens unit L3, and hence to downsize the zoom lens while obtaining the high optical performance.

When the absolute value falls below the lower limit value of the conditional expression (1), the negative refractive power of the third lens unit L3 becomes too strong, that is, the absolute value of the negative refractive power becomes too large, and a variation in optical performance during focusing is increased. When the absolute value exceeds the upper limit value of the conditional expression (1), the negative refractive power of the third lens unit L3 becomes too weak, that is, the absolute value of the negative refractive power becomes too small, and a movement amount of the third lens unit L3 during focusing from the object point at infinity to the object point at close proximity becomes large. As a result, a focus speed becomes low, and further, the entire system of the zoom lens is increased in size. In addition, it is more preferred to set the numerical value range of the conditional expression (1) as follows.

$$1.10 < |f3/fw| < 2.45 \quad (1a)$$

The conditional expression (3) is intended to appropriately set shares of the negative refractive power on the part of the third lens unit L3 and the negative refractive power on the part of the fourth lens unit L4, and hence to downsize the zoom lens while obtaining the high optical performance.

When the ratio falls below the lower limit value of the conditional expression (3), the share of the negative refractive power on the part of the fourth lens unit L4 becomes too large, with the result that a movement amount of the third lens unit L3 during focusing from the object point at infinity to the object point at close proximity becomes large, and that the focus speed is lowered, which is disadvantageous. Further, the entire system of the zoom lens is disadvantageously increased in size. When the ratio exceeds the upper limit value of the conditional expression (3), the share of the negative refractive power on the part of the third lens unit L3 becomes too large, with the result that the variation in optical performance during focusing is increased, and that it becomes difficult to suppress the variation.

The conditional expression (4) is intended to appropriately set the movement amount of the fourth lens unit L4 during zooming, and hence to downsize the zoom lens while obtaining the high optical performance. When the ratio falls below the lower limit value of the conditional expression (4), the movement amount of the fourth lens unit L4 during zooming becomes too large, and it becomes difficult to secure the movement amount of the third lens unit L3 in performing focusing. Moreover, the entire system of the zoom lens is disadvantageously increased in size. When the ratio exceeds the upper limit value of the conditional expression (4), variations in off-axial aberrations such as a curvature of field during zooming are increased, and it becomes difficult to correct the off-axial aberrations.

In addition, it is more preferred to set the numerical value ranges of the conditional expressions (3) and (4) as follows:

$$1.30 < f4/f3 < 8.00 \quad (3a); \text{ and}$$

$$-1.65 < m4/fw < -1.35 \quad (4a).$$

In the zoom lens according to the present invention, in order to further downsize the zoom lens and obtain the high optical performance over the entire zoom range, it is desired to satisfy at least one of the conditions:

$$-1.60 < m3/fw < -1.00 \tag{2}$$

$$0.07 < dp3/fw < 0.45 \tag{5}$$

$$0.03 < TD3/fw < 0.14 \tag{6}$$

$$-0.80 < (R3i-R3o)/(R3i+R3o) < -0.30 \tag{7}$$

$$1.30 < |f1/fw| < 1.83 \tag{8}$$

$$0.70 < f2/fw < 1.28 \tag{9}$$

where dp3 represents a distance on the optical axis from the aperture stop SP, that is included in the second lens unit L2 and configured to move integrally with the second lens unit during zooming, to a lens surface closest to the object side of the third lens unit L3 when focused on an object at infinity at the wide angle end, f1 represents a focal length of the first lens unit L1, f2 represents a focal length of the second lens unit L2, TD3 represents a thickness (length from the lens surface closest to the object side to a lens surface closest to the image side) on the optical axis of the third lens unit L3, m3 represents a movement amount of the third lens unit L3 during zooming from the wide angle end to the telephoto end, and R3o and R3i respectively represent curvature radii of the lens surface closest to the object side of the third lens unit L3 and the lens surface closest to the image side of the third lens unit L3.

Next, technical meanings of the above-mentioned conditional expressions are described. When the ratio falls below the lower limit value of the conditional expression (2), the movement amount of the third lens unit L3 during zooming becomes too large, and the entire system of the zoom lens is increased in size. When the ratio exceeds the upper limit value of the conditional expression (2), a distance on the optical axis between the aperture stop SP, which is moved integrally with the second lens unit L2, and the third lens unit L3 becomes too long at the telephoto end, and an effective diameter of the third lens unit L3 is increased. Consequently, it becomes difficult to reduce a weight of the third lens unit L3.

The conditional expression (5) relates to the distance on the optical axis from the aperture stop SP to the lens surface closest to the object side of the third lens unit L3. When the ratio falls below the lower limit value of the conditional expression (5), the aperture stop SP and the third lens unit L3 are brought too close to each other, and hence it becomes difficult to arrange a drive mechanism for focusing and the like. When the ratio exceeds the upper limit value of the conditional expression (5), the distance on the optical axis between the aperture stop SP and the third lens unit L3 becomes too long, and the effective diameter of the third lens unit L3 is increased. Consequently, it becomes difficult to reduce the weight.

The conditional expression (6) relates to the thickness on the optical axis of the third lens unit L3 (lens unit thickness). When the ratio falls below the lower limit value of the conditional expression (6), the thickness of the third lens unit L3 becomes too small, and hence it becomes difficult to process the lenses. When the ratio exceeds the upper limit value of the conditional expression (6), the thickness of the third lens unit L3 becomes too large, and hence it becomes difficult to reduce the weight.

The conditional expression (7) relates to shapes of the lens surface of the third lens unit L3 on the object side and the lens surface of the third lens unit L3 on the image side. When the ratio falls below or exceeds the lower limit value or the upper limit value of the conditional expression (7), variations in various aberrations accompanying focusing become large, and it becomes difficult to suppress the variations in various aberrations.

The conditional expression (8) relates to the negative refractive power of the first lens unit L1, and is intended to obtain the high optical performance while downsizing the zoom lens. When the absolute value falls below the lower limit value of the conditional expression (8), the negative refractive power of the first lens unit L1 becomes too strong, and it becomes difficult to satisfactorily correct the various aberrations, in particular, the off-axial aberrations. When the absolute value exceeds the upper limit value of the conditional expression (8), the negative refractive power of the first lens unit L1 becomes too weak, and the entire system of the zoom lens is increased in size.

The conditional expression (9) relates to the positive refractive power of the second lens unit L2, and is intended to obtain the high optical performance while downsizing the zoom lens. When the ratio falls below the lower limit value of the conditional expression (9), the positive refractive power of the second lens unit L2 becomes too strong, and it becomes difficult to satisfactorily correct the various aberrations, in particular, axial aberrations. When the ratio exceeds the upper limit value of the conditional expression (9), the positive refractive power of the second lens unit L2 becomes too weak, and a movement amount of the second lens unit L2 for magnification varying is increased.

Consequently, the entire system of the zoom lens is increased in size. It is more preferred to set the numerical value ranges of the conditional expressions (2) and (5) to (9) as follows.

$$-1.55 < m3/fw < -1.10 \tag{2a}$$

$$0.075 < dp3/fw < 0.410 \tag{5a}$$

$$0.035 < TD3/fw < 0.130 \tag{6a}$$

$$-0.68 < (R3i-R3o)/(R3i+R3o) < -0.31 \tag{7a}$$

$$1.40 < |f1/fw| < 1.75 \tag{8a}$$

$$0.85 < f2/fw < 1.10 \tag{9a}$$

In each of Embodiments, the second lens unit L2 consists of a first lens subunit having a positive refractive power and a second lens subunit having a positive refractive power, and it is preferred that the first lens subunit be configured to move so as to have a component in a direction perpendicular to the optical axis during the image blur correction. Moreover, it is preferred that the first lens subunit consist of one lens element. With this, it becomes easy to perform the image blur correction quickly and maintain good optical performance after the image blur correction. It is preferred that the fourth lens unit L4 have at least one aspherical surface. With this, it becomes easy to obtain the high optical performance over the entire zoom range.

In the zoom lens of each of Embodiments, the first lens unit L1 is configured to move toward the image side and then toward the object side during zooming from the wide angle end to the telephoto end. The first lens unit L1 is configured to move toward the image side and then toward the object side during zooming from the wide angle end to the telephoto end, which contributes to an easy reduction in the total length of the zoom lens.

In the zoom lens of each of Embodiments, the third lens unit L3 consists of one lens element. With this, it becomes easy to reduce the weight of the third lens unit L3, which functions as the focus lens unit. In the zoom lens of each of Embodiments, the fourth lens unit L4 consists of one lens element. With this, it becomes easy to downsize the entire system of the zoom lens. Moreover, the fourth lens unit L4 has at least one aspherical surface. The aspherical surface is formed on the fourth lens unit L4, which is relatively close to the aperture stop SP and in which an off-axial ray is easy to separate at the wide angle end and the telephoto end, with the result that the aspherical surface is effectively used with a lens having a relatively small diameter to satisfactorily correct the various aberrations.

In the zoom lens of each of Embodiments, the rear lens group Lr consists of a fifth lens unit L5 having a positive refractive power, and the fifth lens unit L5 consists of one lens element. This reduces an angle of incidence of the off-axial ray on the image plane with a field lens effect to obtain good optical performance without increasing the size of the entire system of the zoom lens. Further, the rear lens group Lr consists of a fifth lens unit having a positive refractive power, and a sixth lens unit having a positive refractive power, and this reduces the angle of incidence of the off-axial ray on the image plane with the field lens effect to obtain the good optical performance without increasing the size of the entire system of the zoom lens.

Next, a digital still camera according to an embodiment of the present invention, which uses the zoom lens described in each of Embodiments as an image pickup optical system is described with reference to FIG. 17.

In FIG. 17, a camera main body 20, and an image pickup optical system 21 formed of the zoom lens described in any one of Embodiments 1 to 8 are illustrated. A solid-state image pickup element (photoelectric conversion element) 22 such as a CCD sensor or a CMOS sensor is included in the camera main body to receive light of a subject image formed by the image pickup optical system 21. A memory 23 records information corresponding to the subject image that has been photoelectrically converted by the solid-state image pickup element 22. A viewfinder 24 is formed of a liquid crystal display panel or the like to observe the subject image formed on the solid-state image pickup element 22.

The zoom lens according to the present invention may be applied to an image pickup apparatus such as the digital still camera as described above to realize an image pickup apparatus having a small size and the high optical performance. The zoom lens in each of Embodiments may similarly be applied to a single-lens reflex camera with a quick return mirror, or a mirrorless single-lens reflex camera without the quick return mirror.

Numerical Embodiments 1 to 8 corresponding to Embodiments 1 to 8 are shown below. In each of Numerical Embodiments 1 to 8, symbol i represents the order of surfaces from the object side. In each of Numerical Embodiments 1 to 8, symbol ri represents a curvature radius of the i-th lens surface counted from the object side, symbol di represents a lens thickness or an air interval between the i-th surface and an (i+1)th surface counted from the object side, and symbols ndi and vdi represent a refractive index and an Abbe-number of a material between the i-th surface and the (i+1)th surface counted from the object side, respectively. Symbol BF represents the back focus. When an X axis is set in the optical axis direction, an H axis is set in a direction perpendicular to the optical axis, a travelling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1+\sqrt{1-(1+K)(H/R)^2}} + A2 \cdot H^2 + A4 \cdot H^4 + A6 \cdot H^6 + A8 \cdot H^8 + A10 \cdot H^{10} + A12 \cdot H^{12}$$

In each of the aspherical coefficients, "e-x" means "$10^{-x}$". In addition to specifications such as the focal lengths and the f-number, a half angle of view and an image height of the zoom lens are the maximum image height that determines the half angle of view, and the total length of the zoom lens is a distance from the first lens surface to the image plane. Back focus BF indicates a length from the last lens surface to the image plane. Moreover, data on the respective lens units indicates focal lengths of the respective lens units, the first lens subunit, which is denoted by 2a, and the second lens subunit, which is denoted by 2b.

In addition, the part where an interval d of each optical surface is (variable) is changed during zooming, and an interval between surfaces corresponding to the focal length is shown in an annexed table. Note that, results of calculations of the conditional expressions based on lens data in Numerical Embodiments 1 to 8 described below are shown in Table 1.

Numerical Embodiment 1

| Unit mm | | | | | |
|---|---|---|---|---|---|
| Surface data | | | | | |
| Surface number | r | d | nd | vd | Effective diameter |
| 1 | 74.240 | 1.10 | 1.77250 | 49.6 | 28.00 |
| 2 | 13.575 | 5.43 | | | 22.11 |
| 3* | 90.868 | 2.11 | 1.52996 | 55.8 | 22.09 |
| 4* | 28.303 | 0.20 | | | 21.76 |
| 5 | 25.310 | 3.76 | 1.84666 | 23.9 | 21.69 |
| 6 | 56.582 | (Variable) | | | 20.66 |
| 7 | 806.621 | 1.76 | 1.48749 | 70.2 | 10.17 |
| 8 | −29.802 | 0.80 | | | 10.31 |
| 9 | 10.514 | 3.32 | 1.60311 | 60.6 | 10.30 |
| 10 | −147.363 | 0.50 | 1.90366 | 31.3 | 9.53 |
| 11 | 23.292 | 2.69 | | | 9.18 |
| 12 (Stop) | ∞ | 2.02 | | | 8.73 |
| 13* | 14.472 | 1.88 | 1.58313 | 59.4 | 8.33 |
| 14 | 354.388 | (Variable) | | | 7.95 |
| 15 | 41.527 | 0.62 | 1.70000 | 48.1 | 7.79 |
| 16 | 8.797 | 1.29 | 1.53775 | 74.7 | 7.96 |
| 17 | 13.459 | (Variable) | | | 8.20 |
| 18* | −11.998 | 1.86 | 1.52996 | 55.8 | 11.48 |
| 19* | −16.160 | (Variable) | | | 13.52 |
| 20 | −58.903 | 3.84 | 1.58913 | 61.1 | 23.74 |
| 21 | −22.779 | 11.05 | | | 24.57 |
| Image plane | ∞ | | | | |

| Aspherical surface data |
|---|
| Third surface |

K = 0.00000e+000     A4 = −3.78582e−005     A6 = 5.37905e−007
A8 = −5.04609e−009   A10 = 2.55009e−011     A12 = −5.86232e−014

Fourth surface

K = 0.00000e+000     A4 = −6.09920e−005     A6 = 4.97325e−007
A8 = −6.17039e−009   A10 = 3.51824e−011     A12 = −1.05215e−013

Thirteenth surface

K = 0.00000e+000     A4 = −1.05211e−004     A6 = −7.51239e−007
A8 = −1.59107e−008

Eighteenth surface

K = 0.00000e+000     A4 = −4.49801e−004     A6 = 9.96347e−006
A8 = −3.67378e−007   A10 = 4.59367e−009     A12 = 3.77288e−011

-continued

Unit mm

Nineteenth surface

K = 0.00000e+000  A4 = −2.25814e−004  A6 = 5.01006e−006
A8 = −9.37488e−008  A10 = 1.00770e−009  A12 = 4.04325e−012

Various data
Zoom ratio 2.83

|  | Wide angle | Intermediate | Telephoto |
|---|---|---|---|
| Focal length | 15.45 | 27.69 | 43.66 |
| F-number | 3.55 | 4.74 | 6.44 |
| Half angle of view (degree) | 41.48 | 26.26 | 17.37 |
| Image height | 13.66 | 13.66 | 13.66 |
| Total lens length | 78.11 | 70.79 | 76.44 |
| BF | 11.05 | 11.05 | 11.05 |
| d6 | 24.71 | 8.18 | 1.12 |
| d14 | 1.00 | 2.45 | 3.36 |
| d17 | 6.45 | 4.99 | 4.09 |
| d19 | 1.73 | 10.94 | 23.65 |
| Entrance pupil position | 16.53 | 13.55 | 11.61 |
| Exit pupil position | −23.09 | −44.69 | −104.52 |
| Front principal point position | 24.99 | 27.49 | 38.78 |
| Rear principal point position | −4.40 | −16.64 | −32.61 |

Zoom lens unit data

| Unit | First surface | Focal length | Lens structure length | Front principal point position | Rear principal point position |
|---|---|---|---|---|---|
| 1 | 1 | −25.29 | 12.61 | 0.59 | −8.85 |
| 2a | 7 | 59.00 | 1.76 | 1.14 | −0.04 |
| 2b | 9 | 19.40 | 10.41 | 3.74 | −5.81 |
| 3 | 15 | −24.25 | 1.90 | 1.33 | 0.12 |
| 4 | 18 | −104.00 | 1.86 | −4.14 | −5.58 |
| 5 | 20 | 60.66 | 3.84 | 3.79 | 1.46 |

Single lens data

| Lens | First surface | Focal length |
|---|---|---|
| 1 | 1 | −21.68 |
| 2 | 3 | −78.49 |
| 3 | 5 | 51.26 |
| 4 | 7 | 59.00 |
| 5 | 9 | 16.40 |
| 6 | 10 | −22.23 |
| 7 | 13 | 25.82 |
| 8 | 15 | −16.07 |
| 9 | 16 | 43.06 |
| 10 | 18 | −104.00 |
| 11 | 20 | 60.66 |

Numerical Embodiment 2

Unit mm

Surface data

| Surface number | r | d | nd | vd | Effective diameter |
|---|---|---|---|---|---|
| 1 | 44.088 | 1.50 | 1.80400 | 46.6 | 26.82 |
| 2 | 12.024 | 7.25 |  |  | 20.50 |
| 3* | 305.869 | 2.16 | 1.52996 | 55.8 | 20.34 |
| 4* | 60.539 | 0.20 |  |  | 20.44 |
| 5 | 44.129 | 1.95 | 1.92286 | 20.9 | 20.08 |
| 6 | 124.704 | (Variable) |  |  | 19.65 |
| 7 | 177.683 | 1.41 | 1.48749 | 70.2 | 10.32 |
| 8 | −58.229 | 1.00 |  |  | 10.50 |
| 9 | 13.551 | 3.21 | 1.77250 | 49.6 | 10.86 |
| 10 | −58.777 | 0.93 | 1.85478 | 24.8 | 10.32 |
| 11 | 42.811 | 1.00 |  |  | 9.93 |
| 12 (Stop) | ∞ | 2.40 |  |  | 9.71 |
| 13* | −42.450 | 1.59 | 1.58313 | 59.4 | 9.07 |
| 14* | −16.814 | (Variable) |  |  | 8.95 |
| 15 | 40.260 | 0.70 | 2.00100 | 29.1 | 7.70 |
| 16 | 17.774 | (Variable) |  |  | 7.79 |
| 17* | −21.539 | 1.30 | 1.58313 | 59.4 | 11.87 |
| 18* | −46.946 | (Variable) |  |  | 13.02 |
| 19 | −86.066 | 4.00 | 1.62041 | 60.3 | 24.68 |
| 20 | −26.339 | 0.20 |  |  | 25.50 |
| 21 | ∞ (FS stop) | 11.36 |  |  | 26.09 |
| Image plane | ∞ |  |  |  |  |

Aspherical surface data

Third surface

K = 0.00000e+000  A4 = −2.97429e−005  A6 = −3.81377e−007
A8 = 8.19005e−009  A10 = −4.63624e−011  A12 = −2.32074e−014

Fourth surface

K = 0.00000e+000  A4 = −6.53077e−005  A6 = −4.60881e−007
A8 = 1.00770e−008  A10 = −8.77115e−011  A12 = 1.58853e−013

Thirteenth surface

K = 0.00000e+000  A4 = −1.59675e−004  A6 = 1.60226e−006
A8 = 1.00496e−007  A10 = −6.92626e−010

Fourteenth surface

K = 0.00000e+000  A4 = 1.74475e−005  A6 = 2.77834e−006
A8 = 3.74502e−008  A10 = 4.48867e−010

Seventeenth surface

K = 0.00000e+000  A4 = 3.23554e−004  A6 = 2.71515e−006
A8 = −5.02802e−007  A10 = 1.32229e−008  A12 = −1.31432e−010

Eighteenth surface

K = 0.00000e+000  A4 = 3.58547e−004  A6 = 1.02352e−006
A8 = −2.88766e−007  A10 = 6.60305e−009  A12 = −5.33924e−011

Various data
Zoom ratio 2.88

|  | Wide angle | Intermediate | Telephoto |
|---|---|---|---|
| Focal length | 15.45 | 30.00 | 44.45 |
| F-number | 3.60 | 5.00 | 6.44 |
| Half angle of view (degree) | 41.48 | 24.48 | 17.08 |
| Image height | 13.66 | 13.66 | 13.66 |
| Total lens length | 79.00 | 73.73 | 80.31 |
| BF | 11.36 | 11.36 | 11.36 |
| d6 | 24.69 | 6.95 | 1.00 |
| d14 | 1.50 | 2.88 | 3.64 |
| d16 | 6.83 | 5.45 | 4.70 |
| d18 | 3.81 | 16.28 | 28.81 |
| Entrance pupil position | 15.95 | 12.50 | 10.72 |
| Exit pupil position | −25.32 | −60.92 | −149.14 |
| Front principal point position | 24.90 | 30.05 | 42.86 |
| Rear principal point position | −4.09 | −18.64 | −33.09 |

Zoom lens unit data

| Unit | First surface | Focal length | Lens structure length | Front principal point position | Rear principal point position |
|---|---|---|---|---|---|
| 1 | 1 | −25.82 | 13.06 | −0.07 | −11.21 |
| 2a | 7 | 90.14 | 1.41 | 0.72 | −0.23 |
| 2b | 9 | 18.91 | 9.13 | 2.15 | −5.49 |
| 3 | 15 | −32.29 | 0.70 | 0.64 | 0.28 |
| 4 | 17 | −69.56 | 1.30 | −0.71 | −1.55 |
| 5 | 19 | 59.64 | 4.00 | 3.47 | 1.06 |

Single lens data

| Lens | First surface | Focal length |
|---|---|---|
| 1 | 1 | −21.00 |
| 2 | 3 | −142.86 |
| 3 | 5 | 73.16 |
| 4 | 7 | 90.14 |
| 5 | 9 | 14.54 |
| 6 | 10 | −28.86 |
| 7 | 13 | 46.68 |
| 8 | 15 | −32.29 |
| 9 | 17 | −69.56 |
| 10 | 19 | 59.64 |

Numerical Embodiment 3

Unit mm

Surface data

| Surface number | r | d | nd | vd | Effective diameter |
|---|---|---|---|---|---|
| 1 | 40.660 | 1.50 | 1.83481 | 42.7 | 26.72 |
| 2 | 12.020 | 7.25 | | | 20.50 |
| 3* | 356.245 | 2.24 | 1.52996 | 55.8 | 20.34 |
| 4* | 62.303 | 0.20 | | | 20.44 |
| 5 | 39.436 | 1.96 | 1.92286 | 18.9 | 20.05 |
| 6 | 92.760 | (Variable) | | | 19.60 |
| 7 | 239.354 | 1.45 | 1.48749 | 70.2 | 10.32 |
| 8 | −46.805 | 1.00 | | | 10.50 |
| 9 | 12.924 | 3.21 | 1.80400 | 46.6 | 10.84 |
| 10 | −74.515 | 0.93 | 1.85478 | 24.8 | 10.24 |
| 11 | 25.021 | 1.13 | | | 9.74 |
| 12 (Stop) | ∞ | 2.27 | | | 9.58 |
| 13* | 69.188 | 1.73 | 1.58313 | 59.4 | 8.98 |
| 14* | −27.187 | (Variable) | | | 8.71 |
| 15 | 80.475 | 0.70 | 1.90043 | 37.4 | 7.87 |
| 16 | 16.603 | (Variable) | | | 8.03 |
| 17* | −41.245 | 1.30 | 1.58313 | 59.4 | 12.23 |
| 18* | −79.989 | (Variable) | | | 13.16 |
| 19 | −154.971 | 4.58 | 1.49700 | 81.5 | 24.72 |
| 20 | −25.142 | (Variable) | | | 25.50 |
| 21 | ∞ (FS stop) | 10.91 | | | 26.15 |
| Image plane | ∞ | | | | |

Aspherical surface data

Third surface

K = 0.00000e+000  A4 = −2.18360e−005  A6 = −3.67913e−007
A8 = 6.03358e−009  A10 = −2.42983e−011  A12 = −9.24215e−014

Fourth surface

K = 0.00000e+000  A4 = −5.40024e−005  A6 = −5.34986e−007
A8 = 9.19977e−009  A10 = −7.43160e−011  A12 = 1.14230e−013

Thirteenth surface

K = 0.00000e+000  A4 = −1.03297e−004  A6 = 2.10649e−006
A8 = 6.16689e−008  A10 = 6.80570e−010

Fourteenth surface

K = 0.00000e+000  A4 = 4.90187e−005  A6 = 4.36912e−006
A8 = −1.96236e−008  A10 = 2.49630e−009

Seventeenth surface

K = 0.00000e+000  A4 = 1.70959e−004  A6 = 6.83812e−006
A8 = −5.07245e−007  A10 = 1.27632e−008  A12 = −1.25120e−010

Eighteenth surface

K = 0.00000e+000  A4 = 2.09858e−004  A6 = 5.03379e−006
A8 = −3.35040e−007  A10 = 7.23831e−009  A12 = −6.01713e−011

Various data
Zoom ratio 2.88

| | Wide angle | Intermediate | Telephoto |
|---|---|---|---|
| Focal length | 15.45 | 30.00 | 44.45 |
| F-number | 3.61 | 4.94 | 6.44 |
| Half angle of view (degree) | 41.48 | 24.48 | 17.08 |
| Image height | 13.66 | 13.66 | 13.66 |
| Total lens length | 79.00 | 72.45 | 80.02 |
| BF | 11.49 | 11.76 | 11.29 |
| d6 | 24.71 | 6.35 | 1.00 |
| d14 | 2.17 | 3.59 | 4.02 |
| d16 | 5.77 | 4.35 | 3.92 |
| d18 | 3.42 | 14.96 | 28.35 |
| d20 | 0.58 | 0.85 | 0.38 |
| Entrance pupil position | 16.01 | 12.44 | 10.85 |
| Exit pupil position | −25.56 | −56.38 | −143.27 |
| Front principal point position | 24.91 | 29.07 | 42.48 |
| Rear principal point position | −4.54 | −19.09 | −33.54 |

Zoom lens unit data

| Unit | First surface | Focal length | Lens structure length | Front principal point position | Rear principal point position |
|---|---|---|---|---|---|
| 1 | 1 | −25.67 | 13.14 | 0.02 | −11.11 |
| 2a | 7 | 80.44 | 1.45 | 0.82 | −0.16 |
| 2b | 9 | 18.61 | 9.27 | 2.29 | −5.46 |
| 3 | 15 | −23.35 | 0.70 | 0.47 | 0.10 |
| 4 | 17 | −147.86 | 1.30 | −0.89 | −1.72 |
| 5 | 19 | 59.69 | 4.58 | 3.61 | 0.59 |

Single lens data

| Lens | First surface | Focal length |
|---|---|---|
| 1 | 1 | −20.94 |
| 2 | 3 | −142.86 |
| 3 | 5 | 73.05 |
| 4 | 7 | 80.44 |
| 5 | 9 | 13.93 |
| 6 | 10 | −21.82 |
| 7 | 13 | 33.69 |
| 8 | 15 | −23.35 |
| 9 | 17 | −147.86 |
| 10 | 19 | 59.69 |

Numerical Embodiment 4

Unit mm

Surface data

| Surface number | r | d | nd | vd | Effective diameter |
|---|---|---|---|---|---|
| 1 | 43.664 | 1.50 | 1.83481 | 42.7 | 28.00 |
| 2 | 12.627 | 7.62 | | | 21.53 |
| 3* | −365.132 | 2.20 | 1.52996 | 55.8 | 21.40 |
| 4* | 95.712 | 0.20 | | | 21.52 |
| 5 | 34.383 | 2.29 | 1.92286 | 18.9 | 21.05 |
| 6 | 66.275 | (Variable) | | | 20.44 |
| 7 | 218.891 | 1.45 | 1.48749 | 70.2 | 10.32 |
| 8 | −47.062 | 1.00 | | | 10.50 |
| 9 | 12.284 | 3.21 | 1.80400 | 46.6 | 10.83 |
| 10 | −178.970 | 0.93 | 1.85478 | 24.8 | 10.15 |
| 11 | 20.858 | 1.75 | | | 9.61 |
| 12 (Stop) | ∞ | 1.65 | | | 9.33 |
| 13* | 50.981 | 1.75 | 1.58313 | 59.4 | 8.89 |
| 14* | −28.637 | (Variable) | | | 8.63 |
| 15 | 57.145 | 0.70 | 1.90043 | 37.4 | 7.39 |
| 16 | 15.534 | (Variable) | | | 7.55 |
| 17* | −319.094 | 1.30 | 1.58313 | 59.4 | 11.82 |
| 18* | 77.888 | (Variable) | | | 12.76 |
| 19 | −162.091 | 4.34 | 1.49700 | 81.5 | 24.69 |
| 20 | −26.874 | (Variable) | | | 25.48 |
| 21 | −80.347 | 1.75 | 1.48749 | 70.2 | 26.01 |
| 22 | −52.933 | 0.20 | | | 26.30 |
| 23 | ∞ (FS stop) | 10.50 | | | 26.56 |
| Image plane | ∞ | | | | |

Aspherical surface data

Third surface

K = 0.00000e+000  A4 = 8.55238e−006  A6 = −3.21502e−007
A8 = 2.74404e−009  A10 = −1.64579e−013  A12 = −1.00602e−013

Fourth surface

K = 0.00000e+000  A4 = −1.69147e−005  A6 = −5.06238e−007
A8 = 5.40121e−009  A10 = −3.32736e−011  A12 = 1.48612e−014

Thirteenth surface

K = 0.00000e+000  A4 = −1.66973e−004  A6 = 1.77165e−006
A8 = 2.62850e−008  A10 = 1.82226e−009

Fourteenth surface

K = 0.00000e+000  A4 = −1.11256e−005  A6 = 4.34942e−006
A8 = −6.18787e−008  A10 = 3.78756e−009

Seventeenth surface

K = 0.00000e+000  A4 = 9.64771e−005  A6 = 3.03837e−006
A8 = −4.78864e−007  A10 = 1.66718e−008  A12 = −2.01125e−010

Eighteenth surface

K = 0.00000e+000  A4 = 1.45183e−004  A6 = 1.26567e−006
A8 = −2.77900e−007  A10 = 8.50856e−009  A12 = −8.78053e−011

Various data
Zoom ratio 2.88

| | Wide angle | Intermediate | Telephoto |
|---|---|---|---|
| Focal length | 15.45 | 30.00 | 44.45 |
| F-number | 3.60 | 4.96 | 6.44 |
| Half angle of view (degree) | 41.48 | 24.48 | 17.08 |
| Image height | 13.66 | 13.66 | 13.66 |
| Total lens length | 80.77 | 74.05 | 81.38 |
| BF | 10.70 | 10.70 | 10.70 |
| d6 | 25.44 | 6.72 | 1.06 |
| d14 | 1.91 | 3.26 | 3.73 |
| d16 | 5.48 | 4.13 | 3.66 |
| d18 | 3.39 | 15.23 | 28.39 |
| d20 | 0.20 | 0.36 | 0.20 |

Unit mm

| | | | |
|---|---|---|---|
| Entrance pupil position | 16.70 | 13.19 | 11.57 |
| Exit pupil position | −25.34 | −61.14 | −182.39 |
| Front principal point position | 25.49 | 30.63 | 45.78 |
| Rear principal point position | −4.95 | −19.50 | −33.95 |

Zoom lens unit data

| Unit | First surface | Focal length | Lens structure length | Front principal point position | Rear principal point position |
|---|---|---|---|---|---|
| 1 | 1 | −26.53 | 13.80 | 0.04 | −11.55 |
| 2a | 7 | 79.60 | 1.45 | 0.81 | −0.17 |
| 2b | 9 | 18.79 | 9.29 | 2.25 | −5.55 |
| 3 | 15 | −23.88 | 0.70 | 0.51 | 0.14 |
| 4 | 17 | −107.23 | 1.30 | 0.66 | −0.16 |
| 5 | 19 | 64.14 | 4.34 | 3.44 | 0.57 |
| 6 | 21 | 311.71 | 1.95 | 3.38 | 2.03 |

Single lens data

| Lens | First surface | Focal length |
|---|---|---|
| 1 | 1 | −21.76 |
| 2 | 3 | −142.86 |
| 3 | 5 | 74.85 |
| 4 | 7 | 79.60 |
| 5 | 9 | 14.41 |
| 6 | 10 | −21.81 |
| 7 | 13 | 31.70 |
| 8 | 15 | −23.88 |
| 9 | 17 | −107.23 |
| 10 | 19 | 64.14 |
| 11 | 21 | 311.71 |

Numerical Embodiment 5

Unit mm

Surface data

| Surface number | r | d | nd | vd | Effective diameter |
|---|---|---|---|---|---|
| 1 | 32.694 | 1.50 | 1.80400 | 46.6 | 27.79 |
| 2 | 11.521 | 8.41 | | | 20.80 |
| 3* | 202.243 | 2.00 | 1.52996 | 55.8 | 20.68 |
| 4* | 54.898 | 0.21 | | | 20.78 |
| 5 | 71.414 | 1.82 | 1.92286 | 18.9 | 20.41 |
| 6 | 515.120 | (Variable) | | | 20.04 |
| 7 | 269.410 | 1.41 | 1.48749 | 70.2 | 10.32 |
| 8 | −52.547 | 1.00 | | | 10.50 |
| 9 | 11.681 | 3.21 | 1.73400 | 51.5 | 10.88 |
| 10 | −357.954 | 0.93 | 1.85478 | 24.8 | 10.23 |
| 11 | 27.781 | 1.17 | | | 9.77 |
| 12 (Stop) | ∞ | 2.23 | | | 9.55 |
| 13* | −303.652 | 1.57 | 1.58313 | 59.4 | 8.89 |
| 14* | −25.134 | (Variable) | | | 8.62 |
| 15 | 31.792 | 0.70 | 2.00100 | 29.1 | 7.96 |
| 16 | 16.314 | (Variable) | | | 7.91 |
| 17* | −25.252 | 1.30 | 1.58313 | 59.4 | 12.17 |
| 18* | −56.591 | (Variable) | | | 13.40 |
| 19 | −81.816 | 3.80 | 1.62041 | 60.3 | 24.76 |
| 20 | −27.464 | 0.20 | | | 25.50 |
| 21 | ∞ (FS stop) | 10.50 | | | 25.90 |
| Image plane | ∞ | | | | |

-continued

| Unit mm |
|---|

Aspherical surface data

Third surface

| | | |
|---|---|---|
| K = 0.00000e+000 | A4 = −5.18235e−005 | A6 = 2.59824e−007 |
| A8 = −5.12267e−009 | A10 = 7.28702e−011 | A12 = −3.53815e−013 |

Fourth surface

| | | |
|---|---|---|
| K = 0.00000e+000 | A4 = −9.18491e−005 | A6 = 1.75955e−007 |
| A8 = −5.05559e−009 | A10 = 6.52891e−011 | A12 = −3.68547e−013 |

Thirteenth surface

| | | |
|---|---|---|
| K = 0.00000e+000 | A4 = −8.22096e−005 | A6 = 8.55696e−007 |
| A8 = 3.39182e−007 | A10 = −4.95845e−009 | |

Fourteenth surface

| | | |
|---|---|---|
| K = 0.00000e+000 | A4 = 1.08887e−004 | A6 = 2.76023e−006 |
| A8 = 2.93647e−007 | A10 = −3.39920e−009 | |

Seventeenth surface

| | | |
|---|---|---|
| K = 0.00000e+000 | A4 = −2.32376e−005 | A6 = 1.18760e−005 |
| A8 = −8.09522e−007 | A10 = 2.07725e−008 | A12 = −1.96508e−010 |

Eighteenth surface

| | | |
|---|---|---|
| K = 0.00000e+000 | A4 = 3.41849e−005 | A6 = 7.53887e−006 |
| A8 = −4.46254e−007 | A10 = 9.60426e−009 | A12 = −7.42587e−011 |

Various data
Zoom ratio 2.88

| | Wide angle | Intermediate | Telephoto |
|---|---|---|---|
| Focal length | 15.35 | 30.00 | 44.16 |
| F-number | 3.58 | 5.01 | 6.44 |
| Half angle of view (degree) | 41.66 | 24.48 | 17.19 |
| Image height | 13.66 | 13.66 | 13.66 |
| Total lens length | 79.00 | 73.45 | 79.76 |
| BF | 10.70 | 10.70 | 10.70 |
| d6 | 24.82 | 6.86 | 1.00 |
| d14 | 1.50 | 2.69 | 3.28 |
| d16 | 6.86 | 5.68 | 5.08 |
| d18 | 3.86 | 16.28 | 28.45 |
| Entrance pupil position | 16.74 | 13.28 | 11.57 |
| Exit pupil position | −24.41 | −56.20 | −121.39 |
| Front principal point position | 25.34 | 29.79 | 40.95 |
| Rear principal point position | −4.85 | −19.50 | −33.66 |

Zoom lens unit data

| Unit | First surface | Focal length | Lens structure length | Front principal point position | Rear principal point position |
|---|---|---|---|---|---|
| 1 | 1 | −26.25 | 13.94 | 0.40 | −11.68 |
| 2a | 7 | 90.33 | 1.41 | 0.80 | −0.16 |
| 2b | 9 | 19.60 | 9.11 | 1.56 | −5.99 |
| 3 | 15 | −34.25 | 0.70 | 0.74 | 0.38 |
| 4 | 17 | −79.41 | 1.30 | −0.67 | −1.51 |
| 5 | 19 | 64.90 | 3.80 | 3.44 | 1.15 |

Single lens data

| Lens | First surface | Focal length |
|---|---|---|
| 1 | 1 | −22.85 |
| 2 | 3 | −142.86 |
| 3 | 5 | 89.66 |
| 4 | 7 | 90.33 |
| 5 | 9 | 15.47 |
| 6 | 10 | −30.13 |
| 7 | 13 | 46.90 |

-continued

| Unit mm |
|---|

| | | |
|---|---|---|
| 8 | 15 | −34.25 |
| 9 | 17 | −79.41 |
| 10 | 19 | 64.90 |

Numerical Embodiment 6

| Unit mm |
|---|

Surface data

| Surface number | r | d | nd | vd | Effective diameter |
|---|---|---|---|---|---|
| 1 | 54.115 | 1.50 | 1.77250 | 49.6 | 28.42 |
| 2 | 13.201 | 6.73 | | | 22.12 |
| 3* | 65.311 | 2.50 | 1.52996 | 55.8 | 22.03 |
| 4* | 34.598 | 0.20 | | | 21.87 |
| 5 | 35.722 | 1.99 | 1.92286 | 18.9 | 21.62 |
| 6 | 64.948 | (Variable) | | | 21.13 |
| 7 | 131.825 | 1.52 | 1.48749 | 70.2 | 11.90 |
| 8 | −66.902 | 1.00 | | | 12.10 |
| 9 | 11.766 | 3.45 | 1.67003 | 47.2 | 12.67 |
| 10 | 74.733 | 0.80 | 1.95906 | 17.5 | 11.95 |
| 11 | 25.860 | 3.64 | | | 11.52 |
| 12 (Stop) | ∞ | 0.30 | | | 10.74 |
| 13* | 86.226 | 2.25 | 1.58313 | 59.4 | 10.68 |
| 14* | −28.734 | (Variable) | | | 10.50 |
| 15 | 29.420 | 0.70 | 1.67003 | 47.2 | 7.67 |
| 16 | 13.766 | (Variable) | | | 7.32 |
| 17* | −23.538 | 1.30 | 1.85400 | 40.4 | 13.85 |
| 18* | −48.892 | (Variable) | | | 15.28 |
| 19 | −1,304.728 | 4.37 | 1.62041 | 60.3 | 24.81 |
| 20 | −30.992 | (Variable) | | | 25.50 |
| 21 | ∞ (FS stop) | 10.50 | | | 26.13 |
| Image plane | ∞ | | | | |

Aspherical surface data

Third surface

| | | |
|---|---|---|
| K = 0.00000e+000 | A4 = −4.45035e−005 | A6 = 3.99849e−007 |
| A8 = −1.60313e−009 | A10 = −1.84583e−012 | |

Fourth surface

| | | |
|---|---|---|
| K = 0.00000e+000 | A4 = −7.50257e−005 | A6 = 3.32130e−007 |
| A8 = −2.19530e−009 | A10 = −2.12171e−012 | |

Thirteenth surface

| | | |
|---|---|---|
| K = 0.00000e+000 | A4 = −2.83156e−004 | A6 = −8.22285e−008 |
| A8 = −3.27053e−008 | A10 = 1.77230e−009 | |

Fourteenth surface

| | | |
|---|---|---|
| K = 0.00000e+000 | A4 = −1.51104e−004 | A6 = 9.59524e−007 |
| A8 = −3.11141e−008 | A10 = 1.75320e−009 | |

Seventeenth surface

| | | |
|---|---|---|
| K = 0.00000e+000 | A4 = −3.21760e−004 | A6 = 4.94912e−006 |
| A8 = −7.52554e−008 | A10 = 7.85091e−010 | |

Eighteenth surface

| | | |
|---|---|---|
| K = 0.00000e+000 | A4 = −2.47106e−004 | A6 = 4.09341e−006 |
| A8 = −4.61045e−008 | A10 = 3.40494e−010 | |

Various data
Zoom ratio 2.88

| | Wide angle | Intermediate | Telephoto |
|---|---|---|---|
| Focal length | 16.51 | 21.00 | 47.49 |
| F-number | 3.49 | 3.77 | 5.80 |
| Half angle of view (degree) | 39.61 | 33.04 | 16.05 |
| Image height | 13.66 | 13.66 | 13.66 |

-continued

Unit mm

| | | | |
|---|---|---|---|
| Total lens length | 82.00 | 77.35 | 84.14 |
| BF | 10.70 | 10.70 | 13.31 |
| d6 | 25.60 | 17.58 | 1.73 |
| d14 | 1.50 | 2.53 | 5.54 |
| d16 | 10.88 | 9.85 | 6.84 |
| d18 | 1.06 | 4.43 | 24.46 |
| d20 | 0.20 | 0.20 | 2.81 |
| Entrance pupil position | 17.60 | 16.44 | 13.05 |
| Exit pupil position | −23.53 | −31.11 | −163.85 |
| Front principal point position | 26.10 | 26.85 | 47.60 |
| Rear principal point position | −6.01 | −10.50 | −36.99 |

Zoom lens unit data

| Unit | First surface | Focal length | Lens structure length | Front principal point position | Rear principal point position |
|---|---|---|---|---|---|
| 1 | 1 | −26.16 | 12.93 | 0.81 | −9.56 |
| 2a | 7 | 91.27 | 1.52 | 0.68 | −0.35 |
| 2b | 9 | 20.95 | 10.44 | 2.70 | −6.33 |
| 3 | 15 | −39.32 | 0.70 | 0.80 | 0.38 |
| 4 | 17 | −54.43 | 1.30 | −0.67 | −1.38 |
| 5 | 19 | 51.10 | 4.37 | 2.76 | 0.07 |

Single lens data

| Lens | First surface | Focal length |
|---|---|---|
| 1 | 1 | −22.97 |
| 2 | 3 | −142.85 |
| 3 | 5 | 83.29 |
| 4 | 7 | 91.27 |
| 5 | 9 | 20.39 |
| 6 | 10 | −41.56 |
| 7 | 13 | 37.23 |
| 8 | 15 | −39.32 |
| 9 | 17 | −54.43 |
| 10 | 19 | 51.10 |

Numerical Embodiment 7

Unit mm

Surface data

| Surface number | r | d | nd | vd | Effective diameter |
|---|---|---|---|---|---|
| 1 | 108.067 | 0.80 | 1.81600 | 46.6 | 24.51 |
| 2 | 13.740 | 4.01 | | | 20.46 |
| 3* | 25.767 | 2.50 | 1.52996 | 55.8 | 20.47 |
| 4* | 18.578 | 0.46 | | | 20.70 |
| 5 | 39.925 | 2.30 | 1.85478 | 24.8 | 20.69 |
| 6 | 355.429 | (Variable) | | | 20.41 |
| 7 | 132.954 | 1.43 | 1.48749 | 70.2 | 12.48 |
| 8 | −73.984 | 2.00 | | | 12.68 |
| 9* | 10.751 | 3.64 | 1.85400 | 40.4 | 13.69 |
| 10* | 117.358 | 0.51 | | | 12.81 |
| 11 | 39.099 | 0.80 | 2.00100 | 29.1 | 12.16 |
| 12 | 8.711 | 0.73 | | | 10.82 |
| 13 | 11.584 | 4.29 | 1.49700 | 81.5 | 10.88 |
| 14 | −22.597 | 0.20 | | | 10.53 |
| 15 (Stop) | ∞ | (Variable) | | | 10.13 |
| 16 | 55.694 | 0.80 | 1.72916 | 54.7 | 7.18 |
| 17 | 12.387 | (Variable) | | | 6.75 |
| 18* | −92.050 | 1.20 | 1.85400 | 40.4 | 14.15 |
| 19* | −432.428 | (Variable) | | | 14.79 |
| 20 | −306.289 | 4.01 | 1.74100 | 52.6 | 26.47 |
| 21 | −31.259 | (Variable) | | | 26.97 |
| 22 | ∞ (FS stop) | 13.80 | | | 27.04 |
| Image plane | ∞ | | | | |

Aspherical surface data

Third surface

K = 0.00000e+000  A4 = −1.65767e−004  A6 = 4.89815e−007
A8 = 3.78710e−010  A10 = −5.33269e−012  A12 = −6.49289e−014

Fourth surface

K = 0.00000e+000  A4 = −2.28363e−004  A6 = 7.31642e−007
A8 = −1.35248e−009  A10 = −1.49118e−011  A12 = 1.04398e−014

Ninth surface

K = 0.00000e+000  A4 = −1.06339e−005  A6 = −2.08809e−007
A8 = 1.49869e−009  A10 = 1.13919e−011

Tenth surface

K = 0.00000e+000  A4 = 7.40426e−005  A6 = −5.24509e−007
A8 = 8.33767e−009  A10 = −4.77832e−011

Eighteenth surface

K = 0.00000e+000  A4 = −5.69265e−005  A6 = 4.13028e−006
A8 = −1.08753e−007  A10 = 1.62089e−009  A12 = −8.34383e−012

Nineteenth surface

K = 0.00000e+000  A4 = −2.79677e−005  A6 = 2.59056e−006
A8 = −5.81221e−008  A10 = 7.66071e−010  A12 = −3.22649e−012

Various data
Zoom ratio 2.88

| | Wide angle | Intermediate | Telephoto |
|---|---|---|---|
| Focal length | 18.19 | 22.74 | 52.33 |
| F-number | 3.65 | 3.91 | 5.80 |
| Half angle of view (degree) | 36.91 | 31.00 | 14.63 |
| Image height | 13.66 | 13.66 | 13.66 |
| Total lens length | 80.00 | 76.74 | 82.46 |
| BF | 15.25 | 14.00 | 14.00 |
| d6 | 23.84 | 17.11 | 1.00 |
| d15 | 1.50 | 2.43 | 5.99 |
| d17 | 9.20 | 8.27 | 4.71 |
| d19 | 0.53 | 5.26 | 27.09 |
| d21 | 1.45 | 0.20 | 0.20 |
| Entrance pupil position | 16.53 | 15.62 | 12.49 |
| Exit pupil position | −21.03 | −30.56 | −249.11 |
| Front principal point position | 25.22 | 26.71 | 54.41 |
| Rear principal point position | −4.39 | −8.94 | −38.53 |

Zoom lens unit data

| Unit | First surface | Focal length | Lens structure length | Front principal point position | Rear principal point position |
|---|---|---|---|---|---|
| 1 | 1 | −26.09 | 10.07 | −0.43 | −8.35 |
| 2a | 7 | 97.73 | 1.43 | 0.62 | −0.34 |
| 2b | 9 | 18.95 | 10.16 | 0.70 | −6.73 |
| 3 | 16 | −22.02 | 0.80 | 0.60 | 0.13 |
| 4 | 18 | −137.16 | 1.20 | −0.18 | −0.82 |
| 5 | 20 | 46.69 | 4.01 | 2.55 | 0.26 |

-continued

| Unit mm | | |
|---|---|---|
| Single lens data | | |
| Lens | First surface | Focal length |
| 1 | 1 | −19.37 |
| 2 | 3 | −142.86 |
| 3 | 5 | 52.44 |
| 4 | 7 | 97.73 |
| 5 | 9 | 13.64 |
| 6 | 11 | −11.35 |
| 7 | 13 | 16.08 |
| 8 | 16 | −22.02 |
| 9 | 18 | −137.16 |
| 10 | 20 | 46.69 |

Numerical Embodiment 8

| Unit mm | | | | | |
|---|---|---|---|---|---|
| Surface data | | | | | |
| Surface number | r | d | nd | vd | Effective diameter |
| 1 | 44.569 | 1.50 | 1.80400 | 46.6 | 27.50 |
| 2 | 12.353 | 7.28 | | | 21.06 |
| 3* | 153.534 | 2.00 | 1.52996 | 55.8 | 20.89 |
| 4* | 50.477 | 0.20 | | | 20.90 |
| 5 | 38.046 | 1.92 | 1.92286 | 18.9 | 20.50 |
| 6 | 75.889 | (Variable) | | | 20.02 |
| 7 | 421.120 | 1.48 | 1.48749 | 70.2 | 10.31 |
| 8 | −40.209 | 1.00 | | | 10.50 |
| 9 | 12.112 | 3.25 | 1.69350 | 53.2 | 10.85 |
| 10 | −204.584 | 0.93 | 1.84666 | 23.9 | 10.24 |
| 11 | 34.799 | 1.85 | | | 9.85 |
| 12 (Stop) | ∞ | 1.75 | | | 9.40 |
| 13* | 106.057 | 1.67 | 1.58313 | 59.4 | 8.88 |
| 14* | −27.812 | (Variable) | | | 8.67 |
| 15 | 49.041 | 0.70 | 1.90366 | 31.3 | 7.10 |
| 16 | 15.648 | (Variable) | | | 7.25 |
| 17* | −16.765 | 1.30 | 1.52996 | 55.8 | 11.03 |
| 18* | −25.988 | (Variable) | | | 12.42 |
| 19 | −77.439 | 3.99 | 1.61405 | 55.0 | 24.66 |
| 20 | −25.775 | 0.20 | | | 25.50 |
| 21 | ∞ (FS stop) | 10.60 | | | 26.13 |
| Image plane | ∞ | | | | |

Aspherical surface data

Third surface

K = 0.00000e+000   A4 = −5.68175e−005   A6 = 5.45347e−007
A8 = −6.57928e−009   A10 = 5.78459e−011   A12 = −2.54252e−013

Fourth surface

K = 0.00000e+000   A4 = −8.63252e−005   A6 = 4.59440e−007
A8 = −6.01240e−009   A10 = 4.24996e−011   A12 = −2.01423e−013

Thirteenth surface

K = 0.00000e+000   A4 = −2.34601e−004   A6 = −4.86415e−006
A8 = 4.06780e−007   A10 = −8.54092e−009

Fourteenth surface

K = 0.00000e+000   A4 = −1.06387e−004   A6 = −3.29772e−006
A8 = 4.04274e−007   A10 = −9.45901e−009

Seventeenth surface

K = 0.00000e+000   A4 = −2.34140e−004   A6 = 1.26198e−005
A8 = −9.96591e−007   A10 = 3.44462e−008   A12 = −4.36551e−010

-continued

| Unit mm |
|---|
| Eighteenth surface |

K = 0.00000e+000   A4 = −9.12180e−005   A6 = 7.47765e−006
A8 = −4.31892e−007   A10 = 1.19972e−008   A12 = −1.18378e−010

Various data
Zoom ratio 2.88

| | Wide angle | Intermediate | Telephoto |
|---|---|---|---|
| Focal length | 15.45 | 30.00 | 44.45 |
| F-number | 3.58 | 4.96 | 6.44 |
| Half angle of view (degree) | 41.48 | 24.48 | 17.08 |
| Image height | 13.66 | 13.66 | 13.66 |
| Total lens length | 77.88 | 72.60 | 80.05 |
| BF | 10.80 | 10.80 | 10.80 |
| d6 | 24.49 | 7.10 | 1.66 |
| d14 | 1.50 | 2.65 | 3.04 |
| d16 | 6.22 | 5.07 | 4.68 |
| d18 | 4.05 | 16.16 | 29.05 |
| Entrance pupil position | 16.37 | 13.16 | 11.65 |
| Exit pupil position | −24.67 | −57.43 | −140.03 |
| Front principal point position | 25.06 | 29.93 | 42.99 |
| Rear principal point position | −4.85 | −19.40 | −33.84 |

Zoom lens unit data

| Unit | First surface | Focal length | Lens structure length | Front principal point position | Rear principal point position |
|---|---|---|---|---|---|
| 1 | 1 | −25.34 | 12.90 | 0.43 | −10.34 |
| 2a | 7 | 75.37 | 1.48 | 0.91 | −0.09 |
| 2b | 9 | 18.46 | 9.44 | 2.35 | −5.69 |
| 3 | 15 | −25.69 | 0.70 | 0.55 | 0.17 |
| 4 | 17 | −93.70 | 1.30 | −1.62 | −2.52 |
| 5 | 19 | 61.12 | 3.99 | 3.60 | 1.20 |

Single lens data

| Lens | First surface | Focal length |
|---|---|---|
| 1 | 1 | −21.71 |
| 2 | 3 | −142.86 |
| 3 | 5 | 80.71 |
| 4 | 7 | 75.37 |
| 5 | 9 | 16.59 |
| 6 | 10 | −35.06 |
| 7 | 13 | 37.96 |
| 8 | 15 | −25.69 |
| 9 | 17 | −93.70 |
| 10 | 19 | 61.12 |

TABLE 1

| Conditional Expression | Embodiment | | | | | | | |
|---|---|---|---|---|---|---|---|---|
| | 1 | 2 | 3 | 4 | 5 | 6 | 7 | 8 |
| (1) | 1.57 | 2.09 | 1.51 | 1.55 | 2.23 | 2.38 | 1.21 | 1.66 |
| (2) | −1.27 | −1.48 | −1.48 | −1.50 | −1.49 | −1.33 | −1.14 | −1.52 |
| (3) | 4.29 | 2.15 | 6.33 | 4.49 | 2.32 | 1.38 | 6.23 | 3.65 |
| (4) | −1.42 | −1.62 | −1.60 | −1.62 | −1.60 | −1.58 | −1.39 | −1.62 |
| (5) | 0.32 | 0.36 | 0.40 | 0.34 | 0.35 | 0.34 | 0.08 | 0.32 |
| (6) | 0.12 | 0.05 | 0.05 | 0.05 | 0.05 | 0.04 | 0.04 | 0.05 |
| (7) | −0.51 | −0.39 | −0.66 | −0.57 | −0.32 | −0.36 | −0.64 | −0.52 |
| (8) | 1.64 | 1.67 | 1.66 | 1.72 | 1.71 | 1.59 | 1.43 | 1.64 |
| (9) | 1.00 | 1.04 | 1.01 | 1.02 | 1.08 | 1.07 | 0.90 | 1.00 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-258167, filed Dec. 22, 2014, which is hereby incorporated by reference herein in its entirety.

What is claimed is:

1. A zoom lens, comprising,
a plurality of lens units having an interval between each pair of adjacent lens units changed for zooming,
wherein the plurality of lens units consists of, in order from an object side to an image side:
   a first lens unit having a negative refractive power;
   a second lens unit having a positive refractive power;
   a third lens unit having a negative refractive power;
   a fourth lens unit having a negative refractive power; and
   a fifth lens unit having a positive refractive power,
wherein the third lens unit is configured to move in an optical axis direction during focusing, and
wherein the following conditional expressions are satisfied:

$0.85 < |f3/fw| < 3.15;$ $-1.60 < m3/fw < -1.00;$ and $1.30 < |f1/fw| < 1.83,$ where fw represents a focal length of the zoom lens at a wide angle end, f3 represents a focal length of the third lens unit, m3 represents a movement amount of the third lens unit during zooming from the wide angle end to a telephoto end, and f1 represents a focal length of the first lens unit.

2. The zoom lens according to claim 1, wherein the second lens unit includes an aperture stop configured to move integrally with the second lens unit during zooming, wherein the following conditional expression is satisfied:

$0.07 < dp3/fw < 0.45,$ where dp3 represents a distance on an optical axis from the aperture stop to a lens surface closest to the object side of the third lens unit when focused on an object at infinity at the wide angle end.

3. The zoom lens according to claim 1, wherein the following conditional expression is satisfied:

$0.03 < TD3/fw < 0.14,$ where TD3 represents a thickness of the third lens unit on an optical axis.

4. The zoom lens according to claim 1, wherein the following conditional expression is satisfied:

$-0.80 < (R3i - R3o)/(R3i + R3o) < -0.30,$ where R3o and R3i represent curvature radii of a lens surface closest to the object side of the third lens unit and a lens surface closest to the image side of the third lens unit, respectively.

5. The zoom lens according to claim 1, wherein the following conditional expression is satisfied:

$0.70 < f2/fw < 1.28,$ where f2 represents a focal length of the second lens unit.

6. The zoom lens according to claim 1, wherein the second lens unit includes a first lens subunit having a positive refractive power, and a second lens subunit having a positive refractive power, and
wherein the first lens subunit is configured to move in a direction having a component in a direction perpendicular to an optical axis during image blur correction.

7. The zoom lens according to claim 6, wherein the first lens subunit includes one lens element.

8. The zoom lens according to claim 1, wherein the first lens unit is configured to move toward the image side and then toward the object side during zooming from the wide angle end to a telephoto end.

9. The zoom lens according to claim 1, wherein the third lens unit includes one lens element.

10. The zoom lens according to claim 1, wherein the fourth lens unit includes one lens element.

11. The zoom lens according to claim 1, wherein the fifth lens unit includes one lens element.

12. An image pickup apparatus comprising:
a zoom lens comprising a plurality of lens units having an interval between each pair of adjacent lens units changed for zooming,
wherein the plurality of lens units consists of, in order from an object side to an image side:
   a first lens unit having a negative refractive power;
   a second lens unit having a positive refractive power;
   a third lens unit having a negative refractive power;
   a fourth lens unit having a negative refractive power; and
   a fifth lens unit having a positive refractive power,
wherein the third lens unit is configured to move in an optical axis direction during focusing, and
wherein the following conditional expressions are satisfied:

$0.85 < |f3/fw| < 3.15;$ $-1.60 < m3/fw < -1.00;$ and $1.30 < |f1/fw| < 1.83,$ where fw represents a focal length of the zoom lens at a wide angle end, f3 represents a focal length of the third lens unit, m3 represents a movement amount of the third lens unit during zooming from the wide angle end to a telephoto end, and f1 represents a focal length of the first lens unit; and
an image pickup element configured to receive light of an image formed by the zoom lens.

13. A zoom lens comprising,
a plurality of lens units having an interval between each pair of adjacent lens units changed for zooming,
wherein the plurality of lens units consists of, in order from an object side to an image side:
   a first lens unit having a negative refractive power;
   a second lens unit having a positive refractive power;
   a third lens unit having a negative refractive power;
   a fourth lens unit having a negative refractive power; and
   a rear lens group consisting of a fifth lens unit having a positive refractive power and a sixth lens unit having a positive refractive power,
wherein the rear lens group has a positive refractive power over an entire zoom range,
wherein the third lens unit is configured to move in an optical axis direction during focusing, and wherein the following conditional expressions are satisfied:

$$0.85 < |f3/fw| < 3.15;$$

$$-1.60 < m3/fw < -1.00; \text{ and}$$

$$1.30 < |f1/fw| < 1.83,$$

where fw represents a focal length of the zoom lens at a wide angle end, f3 represents a focal length of the third lens unit, m3 represents a movement amount of the third lens unit during zooming from the wide angle end to a telephoto end, and f1 represents a focal length of the first lens unit.

14. The zoom lens according to claim 13, wherein the second lens unit includes an aperture stop configured to move integrally with the second lens unit during zooming, wherein the following conditional expression is satisfied:

$$0.07 < dp3/fw < 0.45,$$

where dp3 represents a distance on an optical axis from the aperture stop to a lens surface closest to the object side of the third lens unit when focused on an object at infinity at the wide angle end.

15. The zoom lens according to claim 13, wherein the following conditional expression is satisfied:

$$0.03 < TD3/fw < 0.14,$$

where TD3 represents a thickness of the third lens unit on an optical axis.

16. The zoom lens according to claim 13, wherein the following conditional expression is satisfied:

$$-0.80 < (R3i - R3o)/(R3i + R3o) < -0.30,$$

where R3o and R3i represent curvature radii of a lens surface closest to the object side of the third lens unit and a lens surface closest to the image side of the third lens unit, respectively.

17. The zoom lens according to claim 13, wherein the following conditional expression is satisfied:

$$0.70 < f2/fw < 1.28,$$

where f2 represents a focal length of the second lens unit.

18. The zoom lens according to claim 13, wherein the second lens unit consists of a first lens subunit having a positive refractive power, and a second lens subunit having a positive refractive power, and
wherein the first lens subunit is configured to move in a direction having a component in a direction perpendicular to an optical axis during image blur correction.

19. The zoom lens according to claim 18, wherein the first lens subunit consists of one lens element.

20. The zoom lens according to claim 13, wherein the first lens unit is configured to move toward the image side and then toward the object side during zooming from the wide angle end to a telephoto end.

21. The zoom lens according to claim 13, wherein the third lens unit includes one lens element.

22. The zoom lens according to claim 13, wherein the fourth lens unit includes one lens element.

23. The zoom lens according to claim 13, wherein the fifth lens unit includes one lens element.

24. An image pickup apparatus comprising:
the zoom lens according to claim 13, and
an image pickup element configured to receive light of an image formed by the zoom lens.

* * * * *